United States Patent
Sugawara

(10) Patent No.: US 7,554,220 B2
(45) Date of Patent: Jun. 30, 2009

(54) STABLE POWER SUPPLYING APPARATUS

(75) Inventor: Yoshitaka Sugawara, Osaka (JP)

(73) Assignee: The Kansai Electric Power Co., Inc., Osaka-shi (JP)

( * ) Notice: Subject to any disclaimer, the term of this patent is extended or adjusted under 35 U.S.C. 154(b) by 912 days.

(21) Appl. No.: 10/894,328

(22) Filed: Jul. 19, 2004

(65) Prior Publication Data

US 2006/0014054 A1    Jan. 19, 2006

(51) Int. Cl.
*H02J 9/00* (2006.01)

(52) U.S. Cl. .......................................... 307/64

(58) Field of Classification Search ................ 307/64
See application file for complete search history.

(56) References Cited

U.S. PATENT DOCUMENTS

| 7,242,114 B1 * | 7/2007 | Cannon et al. ............ 307/129 |
| 2003/0150841 A1 * | 8/2003 | Magnussen et al. ......... 218/118 |
| 2005/0105229 A1 * | 5/2005 | Deng et al. ................ 361/90 |

FOREIGN PATENT DOCUMENTS

| JP | 61-116934 | 6/1986 |
| JP | 06105484 A | 4/1994 |
| JP | 08-037800 | 2/1996 |
| JP | 08-098408 | 4/1996 |
| JP | 9-65588 | 3/1997 |
| JP | 11032438 A | 2/1999 |
| JP | 11-330496 | 11/1999 |
| JP | 2002084683 A | 3/2002 |
| JP | 2002-325427 | * 8/2002 |
| JP | 2004-147472 | 5/2004 |
| WO | WO98/43301 | 10/1998 |

OTHER PUBLICATIONS

Hirachi et al. Cost Effective Bidirectional Chopper-based Battery Link UPS with Common Input-Output Bus Line and Its Control Scheme, IEEE Aug. 5, 1996, pp. 1681-1686 ISBN: 0-7803-2775-6.*
Machine translation avavlible online of JP-2002-325427, Aug. 2002, Japan, Sugawara.*

* cited by examiner

*Primary Examiner*—Albert W Paladini
*Assistant Examiner*—Michael Rutland Wallis
(74) *Attorney, Agent, or Firm*—Pearne & Gordon LLP

(57) ABSTRACT

A stable power supply apparatus in accordance with the present invention comprises a secondary battery, a bidirectional chopper circuit and a bidirectional converter, wherein the secondary battery, the chopper circuit and the converter are connected in this order in the direction from the secondary battery side to a system bus line side. The converter is formed of a wide-gap semiconductor device, more particularly, a wide-gap bipolar semiconductor device, and the instantaneous large-power operation capability of the wide-gap bipolar semiconductor device and the instantaneous large-power supplying capability of the secondary battery are utilized. For a short time during which the influence of an instantaneous drop is prevented, the converter is operated as a converter having capability exceeding the instantaneous large-power supplying capability of the secondary battery and having power capacity several times or more the rating of the converter.

14 Claims, 11 Drawing Sheets

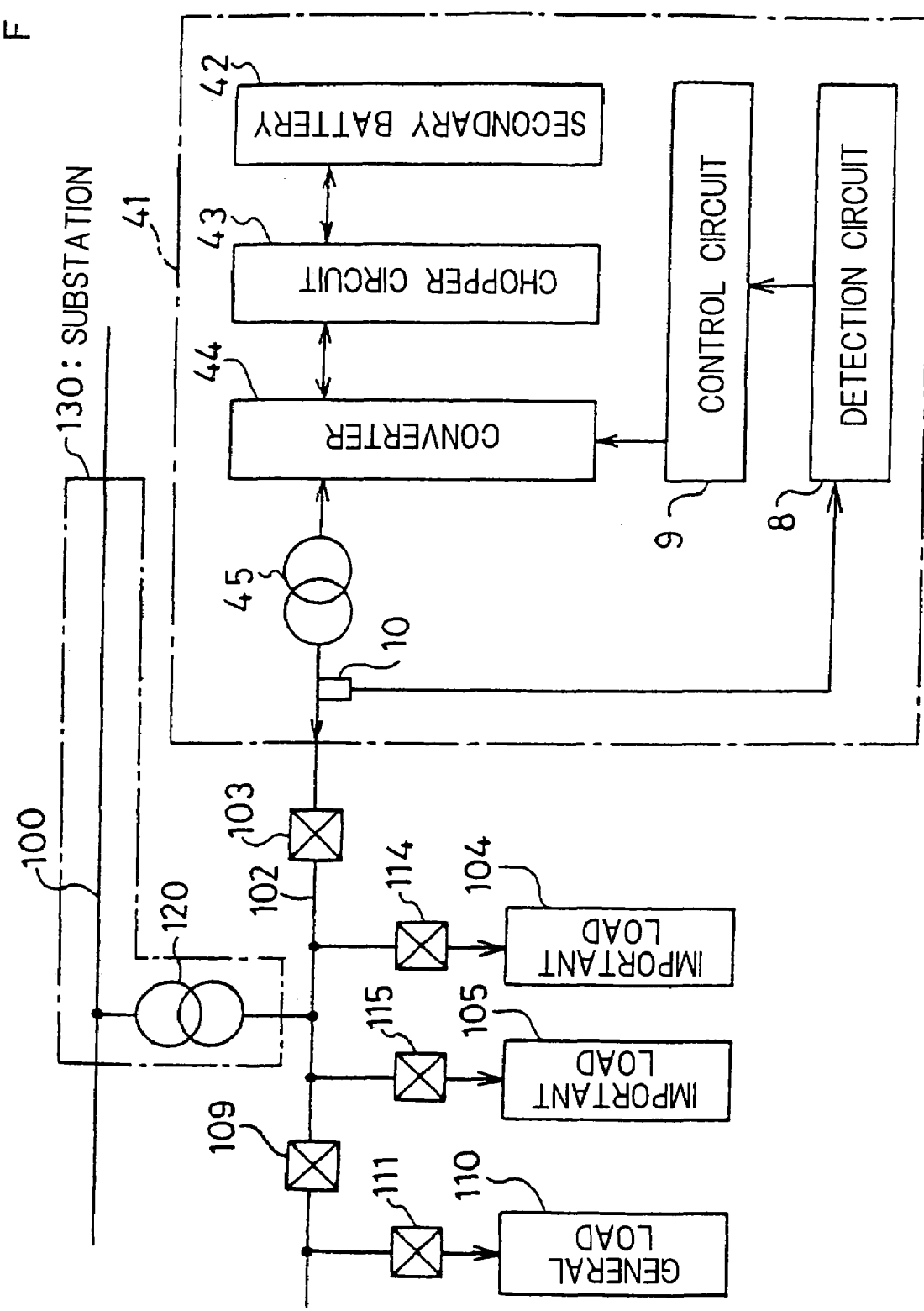

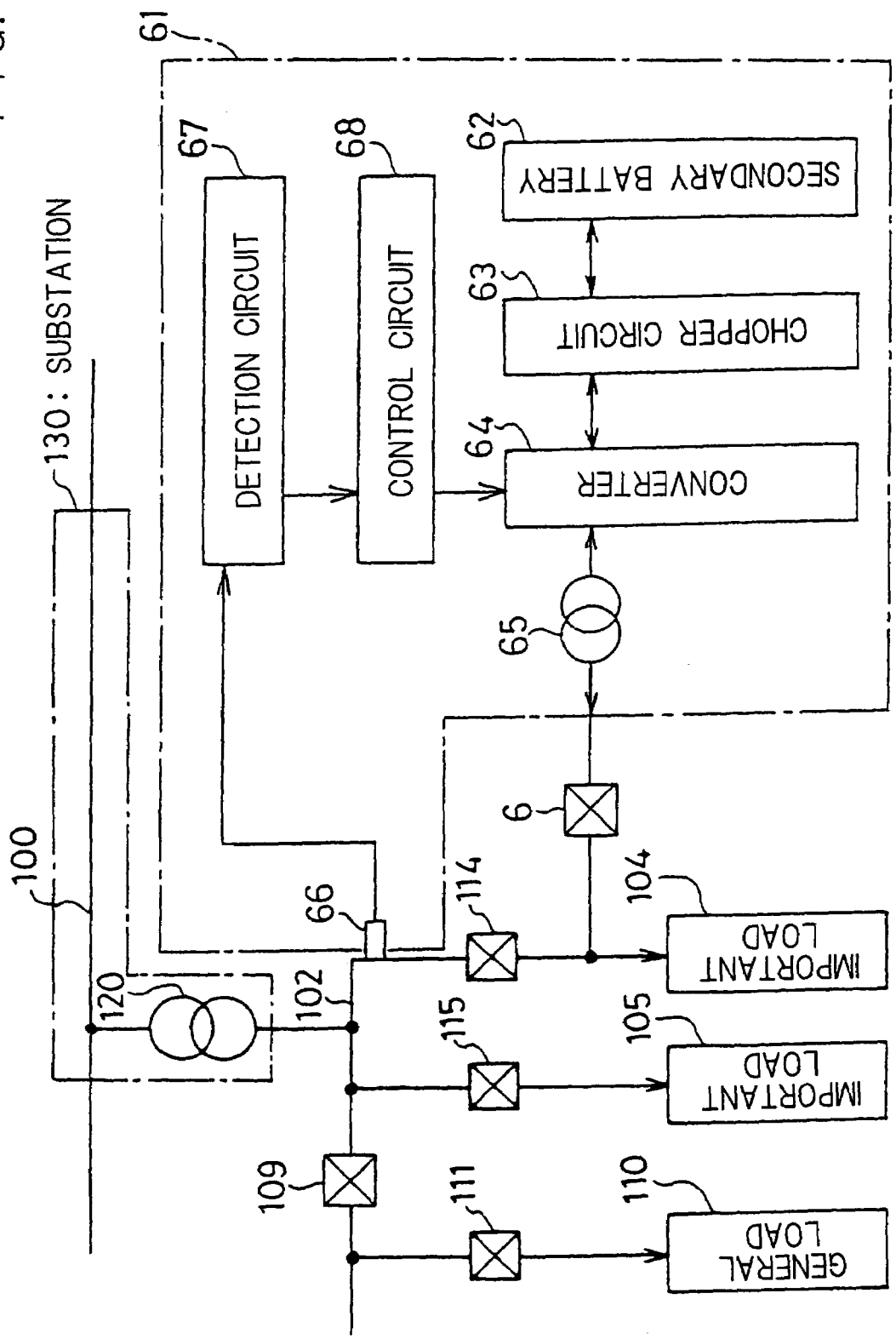

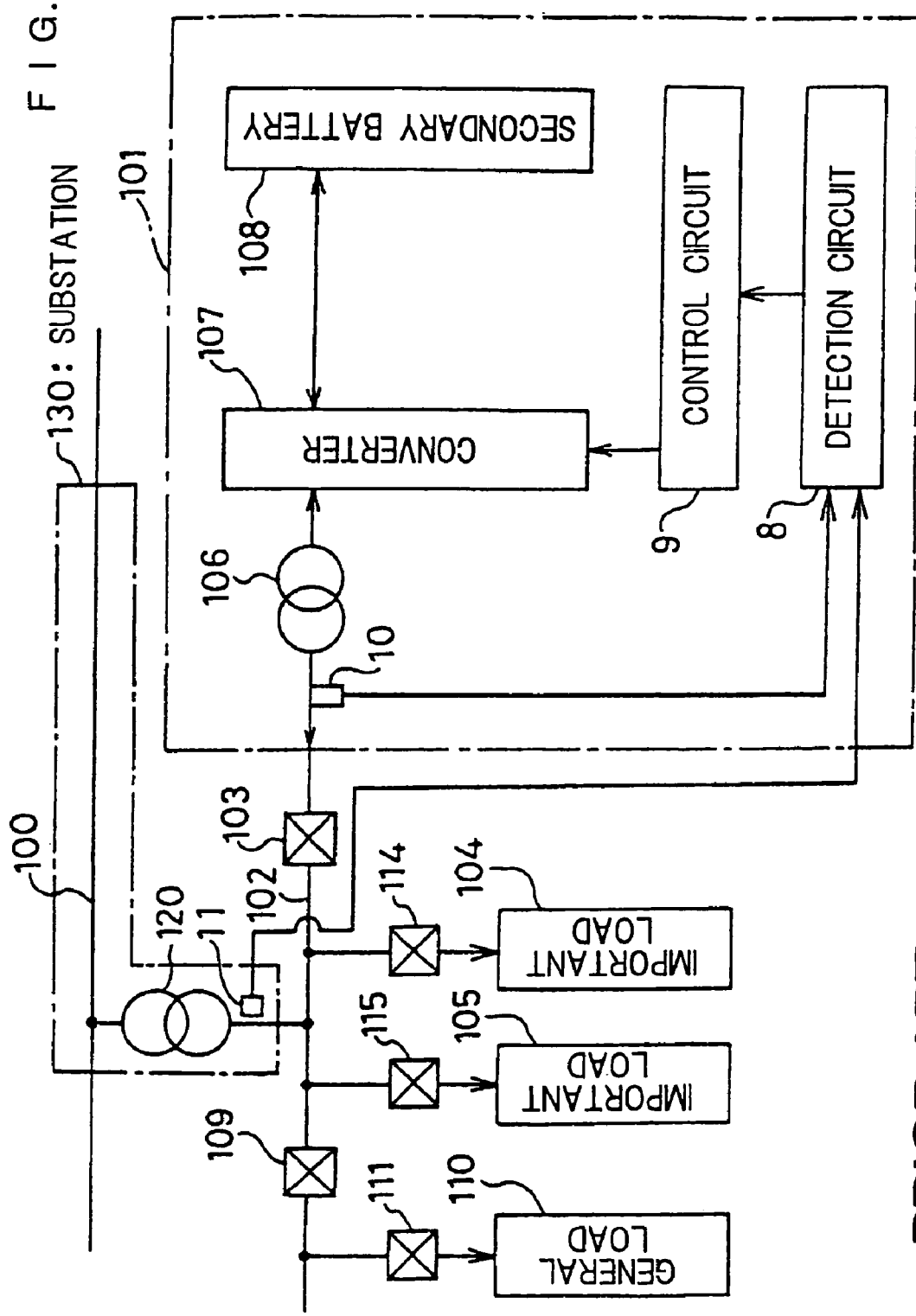

STABLE POWER SUPPLYING APPARATUS

BACKGROUND OF THE INVENTION

The present invention relates to a stable power supply apparatus connected to a power system, and more particularly to a stable power supply apparatus utilizing a secondary battery, such as a redox flow battery, a sodium sulfur battery or a lead-acid battery.

In recent years, electronic apparatuses which are sensitive to fluctuations in a power supply voltage, such as personal computers and precision electronic apparatuses equipped with precision motors, have been used frequently. Hence, the need for countermeasures against an instantaneous voltage drop (hereafter simply referred to as an instantaneous drop), a phenomenon wherein the power supply voltage lowers significantly for a short time, is growing, and demand for stable power supply apparatuses serving as instantaneous voltage drop countermeasure apparatuses is increasing. In addition, it is required to add an instantaneous voltage drop countermeasure function to various kinds of stable power supply apparatuses having been used conventionally, such as a load leveling apparatus, a peak cut apparatus, a frequency fluctuation suppressive apparatus, a voltage regulating apparatus and a flicker countermeasure apparatus. The state wherein the above-mentioned load leveling apparatus, peak cut apparatus, etc. are operating in accordance with their ordinary functions, such as load leveling and peak cutting, is hereafter referred to as "normal time."

FIG. 11 is a block diagram of a power supply system having a conventional stable power supply apparatus 101 using a redox flow battery as a secondary battery. In the figure, a system bus line 102 is connected to the power system 100 of a substation 130 via a transformer 120. The stable power supply apparatus 101 is connected to this system bus line 102 via a switch 103. To the system bus line 102, important loads 104 and 105, for example, are connected via switches 114 and 115, respectively. The important loads 104 and 105 are, for example, important facilities of bulk power customers requiring particularly stable power supply, such as semiconductor production plants and precision machining plants. A general load 110 is also connected to the system bus line 102 via switches 109 and 111. The stable power supply apparatus 101 comprises a transformer 106 mainly serving as an interconnecting reactor, a converter 107 for converting AC power to DC power or vice versa, and a redox flow battery serving as a large-capacity secondary battery 108. This stable power supply apparatus 101 functions as a peak cut apparatus or a load leveling apparatus in normal time; however, it also operates as an instantaneous voltage drop countermeasure apparatus for preventing operation stop or the like of the important loads 104 and 105 during an instantaneous drop owing to the occurrence of a lightning accident or the like.

The function of the stable power supply apparatus 101 will be described below in detail. In "stationary time," a state wherein the supply and demand state of the power in the power supply system connecting the substation 130 to the important loads 104, 105, and the general load 110 is balanced, the AC power supplied from the system bus line 102 to the stable power supply apparatus 101 via the switch 103 and the transformer 106 is converted into DC power by the converter 107 and charges the secondary battery 108. On the other hand, in the case that the power consumption of the important load 104 or 105 increases significantly and the power supplied to the loads 104 and 105 transiently exceeds the capacity of the substation 130, this state is detected by a detection circuit 8 having a voltage detector 10 and a current detector 11. The detected output of the detection circuit 8 is fed to a control circuit 9. The control circuit 9 controls the converter 107 to convert the DC power discharged from the secondary battery 108 into AC power with the converter 107 and supplies an active power corresponding to the amount of the above-mentioned excess to the system bus line 102, thereby stabilizing the supply and demand. The power corresponding to the excess amount that should be supplied from the system bus line 102 is supplied from the stable power supply apparatus 101 instead, whereby the peak of power supplied from the system bus line 102 can be cut; hence, this function is referred to as "peak cut."

In the case that the capacity of the secondary battery 108 of the stable power supply apparatus 101 is made larger so that a power capable of being supplied for a long time can be stored, the apparatus can be used as a load leveling apparatus. In other words, the secondary battery 108 is charged with constant power for a constant time (about eight hours in a typical case) during a low consumption time zone at night, and power is supplied from the secondary battery 108 at constant power for a constant time (about eight hours in a typical case) during a high consumption time zone in the daytime. Hence, a power exceeding the servable power of the substation 130 can be supplied during the high consumption time zone. The stable power supply apparatus for this use levels the large difference between the power demand in the daytime and that at night; hence, the apparatus is referred to as a "load leveling apparatus."

In the case when the power system 100 was struck by lightning and an instantaneous drop occurred in the voltage of the system, the voltage detector 10 detects the instantaneous drop. The voltage of the system must be restored immediately to the voltage before the instantaneous drop in order to prevent operation stop and the like of the important loads 104 and 105 due to the instantaneous drop. For this purpose, the stable power supply apparatus 101 controls the converter 107 with the control circuit 9 and supplies reactive power and active power from the secondary battery 108 to the important loads 104 and 105 via the converter 107 and the system bus line 102 so as to maintain the stable supply of power. When the power supplied from the secondary battery 108 is insufficient, the switch 109 is opened to disconnect the general load 110 that is low in importance so as to supply desired power to at least the important loads 104 and 105 and to prevent operation stop of the important loads 104 and 105. Immediately after recovery from the instantaneous drop, the converter 107 is recovered to its normal operation state, and power is supplied.

In the conventional stable power supply apparatus, during peak cut time and load leveling time, it is necessary to supply, for example, a power of about 500 kW in the former case or a power of about 2 MW in the latter case for a relatively long time (for example, about one hour in the former case or about eight hours in the latter case). When an instantaneous drop occurs owing to lightning during peak cut or load leveling operation, it is necessary to additionally supply a power of one to several MW for a relatively short time (for example, two seconds) in order to recover the lowered voltage.

Secondary batteries, such as a redox flow battery, a sodium sulfur battery and a lead-acid battery, have "instantaneous large-current supplying capability", whereby they can supply, for several seconds to several minutes, a current about several times the rated current thereof that can be supplied in normal time. By utilizing this capability at the time of an instantaneous drop, countermeasures against the instantaneous voltage drop can be taken without increasing the rated capacity of the secondary battery. For this reason, the conventional stable power supply apparatus was equipped with the large converter 107 having a large power capacity corresponding to the instantaneous large current supplying capability of the secondary battery. It was necessary to set the power capacity of the converter 107 to several times the power capacity required in normal time, for example.

Such an instantaneous drop owing to lightning does not occur very frequently, about 20 times at most in a year. In addition, the duration of an instantaneous drop owing to lightning is several seconds even in the case of multiple lightning. A short circuit or a ground fault may occur in a rare case when a small animal, such as a snake or a bird, is caught on power transmission lines or when trees make contact with power transmission lines. In this case, an "instantaneous drop" of a relatively long time, exceeding several minutes, may occur. However, providing a large converter having rated power several times the power supplied in normal time to take countermeasures for an instantaneous drop or an instantaneous power failure that does not occur frequently as described above causes problems; that is, the stable power supply apparatus is made large in size and heavy in weight, the power loss thereof increases, the cost of the equipment rises, and the expenses during operation also rise.

SUMMARY OF THE INVENTION

The present invention purposes to realize a stable power supply apparatus capable of supplying power significantly exceeding the power in normal time at the time of an instantaneous drop or an instantaneous power failure by using a converter having a power rating corresponding to the power required in normal time so that the stable power supply apparatus is made compact in size, light in weight, low in loss and low in cost.

A stable power supply apparatus in accordance with the present invention comprises a secondary battery for charging and discharging DC power, and a converter, connected between the above-mentioned secondary battery and the system bus line of a power transmission power supply and having a switching device formed of a wide-gap bipolar semiconductor device, for converting AC input from the above-mentioned system bus line into DC so as to output to the above-mentioned secondary battery, and for converting DC output from the above-mentioned secondary battery into AC so as to output to the above-mentioned system bus line.

The wide-gap bipolar semiconductor device can control power that is 3 to 30 times the rated power thereof for a short time of several seconds. Furthermore, in the case that a high-performance heatsink is used, the device can control power that is 1.4 to 5 times the rated power for several minutes. In the present invention, a wide-gap semiconductor device is used as the switching device of the converter, and its rated power is set at the value obtained in "normal time." At the time of an instantaneous drop or an instantaneous power failure during which large power is required to be supplied in a short time, the converter is operated at large power significantly exceeding the rated power; however, the converter is not broken since the time during which the large power is supplied is short.

A stable power supply apparatus in accordance with another aspect of the present invention comprises a secondary battery for charging and discharging DC current (Sic), and a bidirectional chopper circuit, connected to the above-mentioned secondary battery, for lowering the charge voltage of the secondary battery and for raising the discharge voltage of the secondary battery. Between the above-mentioned chopper circuit and the system bus line of a power transmission power supply, a converter having a switching device formed of a wide-gap bipolar semiconductor device is connected to convert AC inputted from the above-mentioned system bus line into DC so as to output to the chopper circuit, and to convert DC inputted from the above-mentioned chopper circuit into AC so as to output to the above-mentioned system bus line.

In the stable power supply apparatus in accordance with the present invention, the charge voltage of the secondary battery is lowered and the discharge voltage thereof is raised by the bidirectional chopper circuit; hence, in addition to the above-mentioned effect, the stable power supply apparatus can also be applied to the system bus line having a voltage higher than the voltage of the secondary battery.

A stable power supply apparatus in accordance with another aspect of the present invention comprises a secondary battery for charging and discharging DC power, and a bidirectional chopper circuit, connected to the above-mentioned secondary battery, for lowering the charge voltage of the secondary battery and for raising the discharge voltage of the secondary battery. Between the above-mentioned chopper circuit and the system bus line of a power transmission power supply, a converter having a switching device formed of a wide-gap bipolar semiconductor device is connected to convert AC inputted from the above-mentioned system bus line into DC so as to output to the chopper circuit, and to convert DC inputted from the above-mentioned chopper circuit into AC so as to output to the above-mentioned system bus line. The above-mentioned stable power supply apparatus further comprises a detection apparatus for detecting the voltage of the above-mentioned system bus line and for detecting the supply and demand state of the power on the basis of the detected voltage, and a control circuit for controlling the above-mentioned converter on the basis of the detected output of the above-mentioned detection apparatus so as to charge the above-mentioned secondary battery when the supply and demand state of the power between a load connected to the above-mentioned system bus line and the power transmission power supply is balanced and so as to discharge the above-mentioned secondary battery and to supply power to the system bus line when the demand becomes larger than the supply.

In accordance with the present invention, in addition to the above-mentioned effect, by detecting the voltage of the system bus line, the generation of an instantaneous drop is detected, whereby the voltage of the system can be prevented from lowering at the time of the instantaneous drop.

A stable power supply apparatus in accordance with another aspect of the present invention comprises a secondary battery for charging and discharging DC power, and a bidirectional chopper circuit, connected to the above-mentioned secondary battery, for lowering the charge voltage of the secondary battery and for raising the discharge voltage of the secondary battery. Between the above-mentioned chopper circuit and the system bus line of a power transmission power supply, a converter having a switching device formed of a wide-gap bipolar semiconductor device is connected to convert AC inputted from the above-mentioned system bus line into DC so as to output to the chopper circuit, and to convert DC inputted from the above-mentioned chopper circuit into AC and so as to output to the above-mentioned system bus line. The above-mentioned stable power supply apparatus further comprises a detection apparatus for detecting the voltage and current of the above-mentioned system bus line and for detecting the supply and demand of the power of the above-mentioned load on the basis of the detected voltage and current, and a control circuit for controlling the above-mentioned converter on the basis of the detected output of the above-mentioned detection apparatus so as to charge the above-mentioned secondary battery when the supply and demand of the power between a load connected to the above-mentioned system bus line and the power transmission power supply is balanced, and so as to discharge the above-mentioned secondary battery and to supply power to the system bus line when the demand becomes larger than the supply.

In accordance with the present invention, in addition to the above-mentioned effect, by detecting the voltage and current of the system bus line, the supply and demand state of the power of the system can be detected. Since the supply and demand state of the power can be detected, the stable power supply apparatus in accordance with the present invention can be used for load leveling.

A stable power supply apparatus in accordance with another aspect of the present invention outputs discharge power that is 2 to 12 times the rated discharge power of the above-mentioned secondary battery from the above-mentioned secondary battery at the time of an instantaneous voltage drop during which the voltage of the above-mentioned system bus line lowers significantly for a short time owing to the occurrence of a lightning accident or the like. The above-mentioned converter is controlled by the above-mentioned control circuit so as to convert the discharge power of the above-mentioned secondary battery, corresponding to that of 2 to 12 times the rated control power of the converter, into AC and to output a predetermined reactive power and an active power that is 2 to 12 times the rated power to the system bus line.

At the time of instantaneous voltage drop during which the voltage of the above-mentioned system bus line lowers significantly for a short time owing to the occurrence of a lightning accident or the like, discharge power that is 2 to 12 times the rated discharge power of the above-mentioned secondary battery is output from the above-mentioned secondary battery. The above-mentioned converter is controlled by the above-mentioned control circuit to convert the discharge power of the above-mentioned secondary battery, corresponding to that of 2 to 12 times the rated control power of the converter, into AC and to output predetermined reactive power and active power that is 2 times or less the rated power to the system bus line.

It is characterized in that a transformer having the function of an interconnecting reactor is provided between the above-mentioned system bus line and converter.

It is characterized in that an interconnecting reactor is provided between the above-mentioned system bus line and converter.

It is characterized in that a transformer is provided between the above-mentioned system bus line and converter.

It is characterized in that the above-mentioned secondary battery is a redox flow battery or a sodium sulfur battery.

It is characterized in that the above-mentioned wide-gap bipolar semiconductor device is a gate turn off thyristor (GTO) wherein silicon carbide (SiC) is used as a basic material.

It is characterized in that the above-mentioned wide-gap bipolar semiconductor device is a semiconductor device wherein gallium nitride is used as a basic material.

It is characterized in that the above-mentioned wide-gap bipolar semiconductor device is formed of at least one SiC-GTO chip.

It is characterized in that the above-mentioned wide-gap bipolar semiconductor device is an insulated gate bipolar transistor (IGBT) wherein silicon carbide (SiC) is used as a basic material.

It is characterized in that the above-mentioned wide-gap bipolar semiconductor device is formed of at least one SiC-GTO chip or a plurality of SiC-GTO chips connected in parallel.

It is characterized in that the above-mentioned wide-gap bipolar semiconductor device is formed of at least one SiC-IGBT chip or a plurality of SiC-IGBT chips connected in parallel.

A stable power supply apparatus in accordance with another aspect of the present invention comprises a secondary battery for charging and discharging DC power, and a bidirectional chopper circuit for lowering the charge voltage of the above-mentioned secondary battery and for raising the discharge voltage of the above-mentioned secondary battery. Between the above-mentioned chopper circuit and the system bus line of a power transmission power supply, a converter having a wide-gap bipolar semiconductor device serving as a switching device is connected to convert AC inputted from the above-mentioned system bus line into DC so as to output to the chopper circuit, and to convert DC inputted from the above-mentioned chopper circuit into AC so as to output to the above-mentioned system bus line. The above-mentioned stable power supply apparatus further comprises a detection apparatus for detecting the frequency of the above-mentioned system bus line and for detecting the supply and demand state of the power on the basis of the detected frequency, and a control circuit for controlling the above-mentioned converter on the basis of the detected output of the above-mentioned detection apparatus so as to charge the above-mentioned secondary battery when the supply and demand state of the power between a load connected to the above-mentioned system bus line and the power transmission power supply is balanced, and so as to discharge the above-mentioned secondary battery and to supply power to the system bus line when the demand becomes larger than the supply.

A stable power supply apparatus in accordance with another aspect of the present invention comprises a secondary battery for charging and discharging DC power, and a wide-gap bipolar semiconductor device serving as a switching device and connected between the above-mentioned secondary battery and a load connected to the system bus line of a power transmission power supply. The above-mentioned stable power supply apparatus further comprises a converter for converting AC inputted from the above-mentioned system bus line into DC so as to output to the above-mentioned secondary battery, and for converting DC output from the above-mentioned secondary battery into AC and so as to output to the above-mentioned load.

This stable power supply apparatus further comprises a detection apparatus for detecting the voltage and current of the power supplied to a load connected to the above-mentioned system bus line and for detecting the supply and demand state of the power of the above-mentioned load on the basis of the detected voltage and the current. The above-mentioned stable power supply apparatus further comprises a control circuit for controlling the above-mentioned converter on the basis of the detected output of the above-mentioned detection apparatus so as to charge the above-mentioned secondary battery when the supply and demand of the power between the above-mentioned load and power transmission power supply is balanced, and so as to discharge the above-mentioned secondary battery and to supply power to the system bus line when the demand becomes larger than the supply.

BRIEF DESCRIPTION OF DRAWINGS

FIG. 2 (b) is a sectional view taken on line b-b of FIG. 2 (a);

FIG. 9 is a block diagram of the stable power supply apparatus in accordance with the fourth embodiment of the present invention in the case of dealing with an instantaneous drop;

FIG. 10 is a block diagram of the stable power supply apparatus in accordance with the fifth embodiment of the present invention in the case of dealing with an instantaneous drop; and FIG. 11 is the block diagram of the conventional stable power supply apparatus for peak cut.

DETAILED DESCRIPTION OF THE INVENTION

Figure 1:
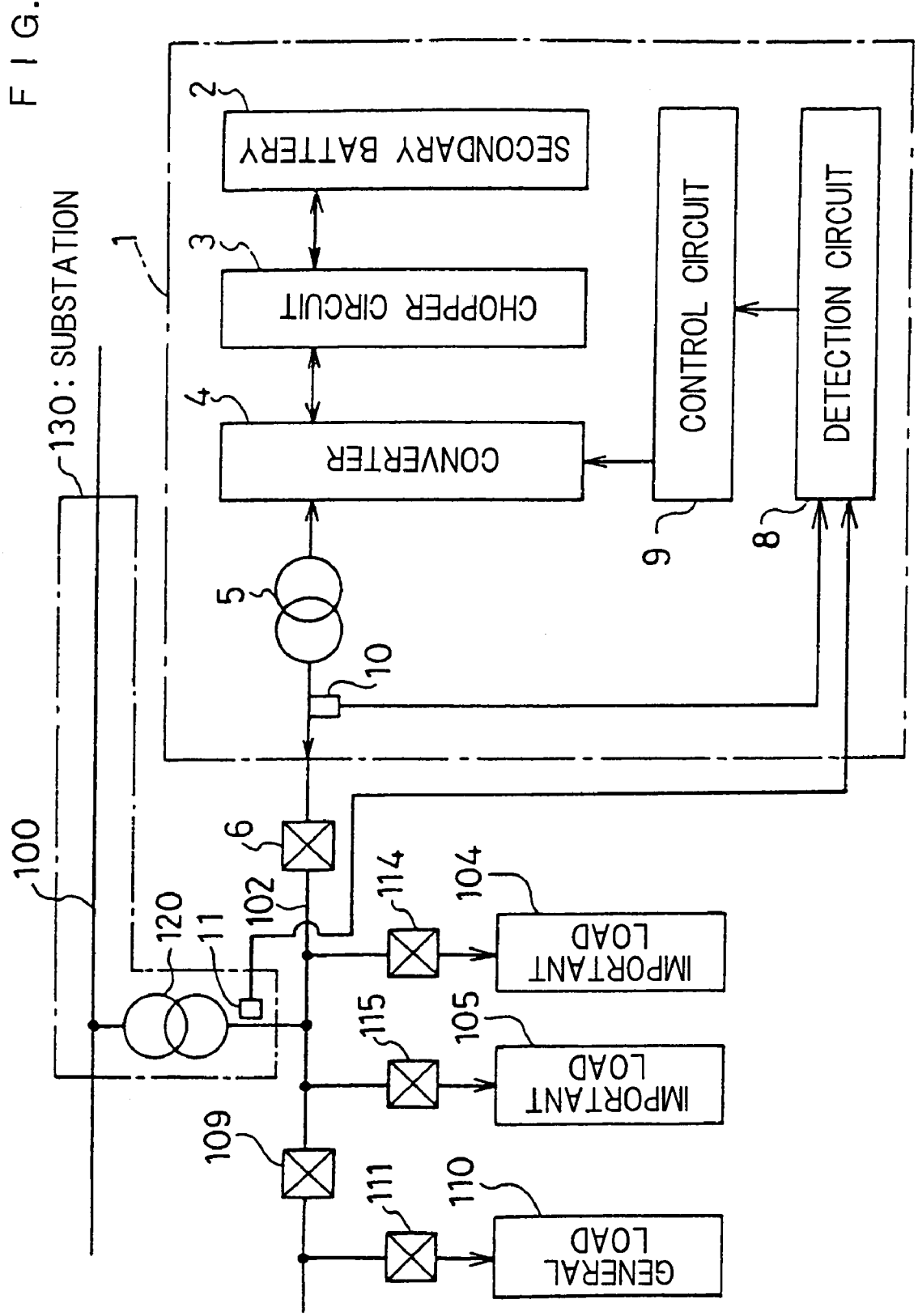
FIG. 1 is a block diagram showing a stable power supply apparatus for peak cut in accordance with a first embodiment of the present invention.

Embodiments in accordance with the present invention will be described below.

Wide-gap semiconductor devices in which SiC (silicon carbide), GaN (gallium nitride), diamond, etc. are used as basic materials are low in loss and have a physical property of being capable of operating at high temperatures in comparison with semiconductor devices in which Si (silicon) is used as a basic material. With attention paid to this point, the maximum allowable power in a short time, which was controlled by a wide-gap semiconductor device was examined, and it was found that the wide-gap semiconductor device was not broken for a short time of about several seconds even when a current far beyond the rated current thereof was passed therethrough. It was confirmed that a wide-gap bipolar semiconductor device in particular had "instantaneous large-power operation capability" that was able to pass a large current beyond the "instantaneous large-current supplying capability" of a secondary battery. A converter is formed by using a wide-gap semiconductor device having this characteristic as a switching device and is operated at a voltage and a current within the rating of the wide-gap semiconductor device in normal time. At the time of an instantaneous drop, discharged DC power several times the value in normal time depending on the instantaneous large power supplying capability of the secondary battery is converted into AC power by the above-mentioned converter and is supplied to a system bus line.

In normal time, after the DC output voltage obtained by the discharge of the secondary battery is raised by a chopper circuit, it is converted into AC power by the converter and is output to the system bus line, whereby various power stabilizing functions are carried out. The secondary battery is charged in "stationary time" wherein the power stabilizing functions are not carried out. When the secondary battery is charged, the AC power from the system bus line is converted into DC power by the converter and lowered by the chopper circuit and is charged into the secondary battery. The power values charged and discharged in stationary time and in normal time are within the rating of the converter.

At the time of an instantaneous drop or an instantaneous power failure, a current several times the rating is supplied from the secondary battery depending on the instantaneous large-current supplying capability thereof while a voltage almost close to the rated voltage of the battery is maintained. In other words, DC power almost several times the rated power is supplied. After this DC power is raised by the chopper circuit, it is converted into AC power by the converter and is output to the system bus line, whereby power supply is stabilized.

As the converter, a converter having a generally known PWM-operation-type switching device is used to carry out pulse width modulation. It is desired that the phase of the output voltage of a pulse width modulation converter (hereafter referred to as a PWM converter) should be advanced with respect to the phase of the voltage of the system bus line, and the same power as that obtained in normal time should be output to the system bus line, and that active power for stable power supply should be output. Since the voltage of the system bus line lowers at an instantaneous drop in many cases, the converter is operated by enlarging the pulse width in pulse width modulation, whereby a reactive power several times the value obtained in normal time is output, and the dropped voltage of the system bus line is recovered to the voltage before the instantaneous drop.

In the case that the wide-gap semiconductor devices of the converter are operated at the time of an instantaneous drop at large power depending on the instantaneous large-current supplying capability of the secondary battery, it was found by experiment that the instantaneous large-power operation capability of a unipolar semiconductor device, such as a wide-gap semiconductor MOSFET, was about two times the rating thereof. On the other hand, it was found by experiment that the instantaneous large-power operation capability of a wide-gap bipolar semiconductor device, such as a GTO (Gate turn off thyristor) or an IGBT (Insulated gate bipolar transistor), was larger than that of the unipolar semiconductor device, 3 to 30 times or more the rating. According to the results of the above-mentioned experiments, the wide-gap bipolar semiconductor device is more suitable for the semiconductor device that is used for the switching device of the converter of the stable power supply apparatus in accordance with the present invention rather than the unipolar semiconductor device.

The converter can be formed using one wide-gap semiconductor chip for controlling small power. For controlling large power, it is difficult to produce a chip having a large area capable of passing a large current such as a use in the present invention, because numerous crystal defects are present in the SiC of the basic material, of the wide-gap semiconductor device. If the technology for reducing the crystal defects in SiC is improved, a semiconductor device can be attained by using a single chip having a large area, as in the case of Si; however, in the present state, a method of connecting a plurality of chips in parallel is thought to pass a large current. It is regarded that the parallel connection of a plurality of chips, in the case of a Si semiconductor device, is possible in a combination device such as an IGBT in which unipolar operation and bipolar operation coexist; however, it is regarded that the parallel connection is difficult in the case of a semiconductor device such as a GTO in which only the bipolar operation exists. The reason is described below. In the combination device such as an IGBT in which unipolar operation and bipolar operation coexist, the bipolar operation has a negative temperature dependency, and the unipolar operation has a positive temperature dependency. Therefore, even if a large current flows, thermal runaway does not occur because of the canceling effect of the positive and negative temperature dependencies. In other words, in the case of the unipolar operation device, the resistance of channel is the largest in the ON resistance of the device, and the positive temperature dependency of this channel resistance is mainly predominant.

On the other hand, in the case of the bipolar operation device, when its temperature rises, its junction potential lowers and carrier injection increases; however, because its life time is prolonged, its current increases. Hence, the temperature of the device rises further, the carrier injection and the increase of the life time are accelerated, and the current increases further; the device thus has a negative temperature dependency. Even if a large current flows, thermal runaway does not occur in the IGBT because of the canceling effect of the positive and negative temperature dependencies. However, a pure bipolar device such as a GTO has only a negative temperature dependency; hence, when a large current flows, thermal runaway occurs, resulting in the breakage of the device.

In the case of the SiC, the inventor found that the increase of current by parallel connection was possible even in the case of the GTO if the flowing time was not long; the stable power supply apparatus in accordance with the present invention is attained by applying this matter. Large current flowing can be obtained by the matter that the resistance of the low-concentration base region which is the electric field relaxation region of a SiC-GTO has a positive temperature dependency. In other words, at a low temperature, the negative temperature dependency in the bipolar operation is larger than the positive temperature dependency of the resistance of the low-concentration base region; hence, the SiC-GTO has a negative temperature dependency. However, the inventor found a phenomenon that the SiC-GTO had a positive (Sic) temperature dependency because the positive temperature dependency of the low-concentration base region canceled the negative temperature dependency of the bipolar operation at several hundred degrees centigrade or more, and conversely the positive (Sic) temperature dependency became predominant.

Since the SiC has a wide bandgap, its property as a semiconductor can be maintained at a high temperature of 1000° C. or more, the present invention fully utilizes this phenomenon. On the other hand, in the case of a Si semiconductor device, the limit temperature at which its property as a semiconductor is maintained is low. Since the semiconductor must usually be used at a junction temperature of 200° C. or less, the above-mentioned phenomenon does not emerge, and its utilization is difficult. The time period in which this phenomenon can be utilized is the time period from the time when the internal temperature of the device rises owing to the difference between the amount of heat generated inside the device and the amount of heat dissipated outside the device to the time when the internal temperature of the device reaches the limit temperature at which its property as a semiconductor cannot be maintained. This time period is determined by the structure of the device, the density of flowing current, the structure of the module, etc. The fact that the SiC has low power loss and high thermal conductivity in comparison with the Si is very advantageous in increasing the instantaneous large-power operating capability when it is applied to a converter. In addition, the switching time of a GTO using the SiC is about 1 is, shorter by an order or more of magnitude than that of a GTO using the Si. In this respect, in the case of GTOs such as GTOs of the Si, having a long interrupting time at the turn-off operation, a problem in which interrupting currents concentrate in a few of the GTOs and the GTOs are apt to be broken can be prevented, and parallel connection is made possible.

In addition, also in a SiC-IGBT, unlike a Si-IGBT, it was found that the positive temperature dependency of the resistor in the low-concentration drift region serving as the electric field relaxation region gives a significant effect, and that the SiC-IGBT exhibits a positive temperature dependency at several hundred degrees centigrade or more. In other words, in the Si-IGBT, at a temperature not more than the limit temperature at which Si can firmly maintain its property as a semiconductor, the negative temperature dependency of the bipolar operation is cancelled by the positive temperature dependency of the unipolar operation, and thermal runaway is prevented even if a large current flows; however, at 200° C. close to the limit temperature or more, the bipolar operation becomes predominant abruptly. At around this temperature, the positive temperature dependency in the low-concentration drift region is still small and cannot cancel the abruptly increased negative temperature dependency of the bipolar operation, resulting in thermal runaway. However, in the case of the SiC-IGBT, at several hundred degrees centigrade or more, the positive temperature dependency of the low-concentration drift region cancels the negative temperature dependency of the bipolar operation, and the SiC-IGBT turns to have a positive temperature dependency, because conversely the positive temperature dependency becomes predominant. As a result, by connecting a plurality of SiC-IGBTs in parallel, a current far larger than that in the case of Si-IGBTs can be passed for a short time, and the reliability thereof is improved.

A stable power supply apparatus having a conventional converter using a GTO or IGBT of Si is required to have a converter of a large capacity corresponding to the power several times the power supplied from the secondary battery in normal time at the time of an instantaneous drop.

On the other hand, the converter using a GTO or an IGBT of SiC in the stable power supply apparatus of the present invention can withstand an excessive current several times the rated current, whereby the converter in which its rated current is set at a current required in normal time can deal with the large current flowing at the time of an instantaneous drop. Hence, various components constituting the stable power supply apparatus, such as a transformer serving as a reactor, heatsinks for semiconductor devices and bus bars, can be made compact. In addition, since the capacity is small, the absolute value of the loss is small even if conversion efficiency is the same; hence, loss reduction is realizable, and significant cost reduction can also be attained. A large converter for power utility is required to have a high withstand voltage and also a high reliability in comparison with a small converter. Furthermore, since it is required to have many protective functions, it is high in price. For example, in the case of a use requiring a converter of 5 MW in the conventional stable power supply apparatus, that of 1 MW is sufficient to the apparatus in accordance with the present invention. Therefore, the cost is about a fifth of that of the conventional apparatus, and significant cost reduction can be attained. The effect of cost reduction becomes large rather in the stable power supply apparatus having a large power capacity. As described above, the stable power supply apparatus in accordance with the present invention is made significantly compact in size, light in weight, low in loss and low in cost.

Preferred embodiments in accordance with the present invention will be described below referring to FIGS. 1 to 7.

FIRST EMBODIMENT

FIG. 1 is a block diagram of a stable power supply apparatus 1 for peak cut in accordance with a first embodiment of the present invention and a power supply system, to which the stable power supply apparatus 1 is connected, from a substation 130 to important loads 104 and 105 and an general load 110. "Peak cut" is defined as supplying an excess amount from a power supply other than the substation 130 when power consumption exceeds the power that can be supplied from the substation 130, and the period in this state is referred to as "peak cut time." In addition, the period in states other than the state of the peak cut time is referred to as "normal time." In the figure, a system bus line 102 is connected to the power system 100 of the substation 130 via a transformer 120. To the system bus line 102, particularly important loads 104 and 105 are connected via switches 114 and 115, respectively. Furthermore, a general load 110, less important than the important loads 104 and 105, is also connected to the system bus line 102 via switches 109 and 111. When an abnormality occurs in the system bus line 102, the switch 109 first disconnects the general load 110 so that power supply to the important loads 104 and 105 is maintained preferentially. To the system bus line 102, the stable power supply apparatus 1 in accordance with the present invention is connected via a switch 6. Since a control apparatus for operating the switches 6, 109, 111, 114 and 115 is well known in this field, it is not shown in the figure.

The stable power supply apparatus 1 comprises a secondary battery 2 formed of a redox flow battery rated at 500 kW for example, a bidirectional chopper circuit 3 for raising and lowering the voltage thereof, a converter 4 rated at 500 kW and a transformer 5 also serving as an interconnecting reactor, and is connected to the system bus line 102 of 6.6 kV via the switch 6. The voltage and current of the system bus line 102 are detected by a voltage detector 10 and a current detector 11, respectively, and the supply and demand state of the power is detected by a detection circuit 8 on the basis of the detected voltage and current. A potential transformer (PT) or the like is used for the voltage detector 10. The current detector 11 is a current transformer (CT) or the like provided inside the substation 130 and detects the output current of the substation 130. A control circuit 9 controls the output power of the converter 4 depending on the detected output fed from the detection circuit 8 and indicating the supply and demand state of the power. The redox flow battery serving as a secondary battery has a capacity capable of supplying a DC current of 625 A at a voltage of 800 V for about one hour. The switching devices of the chopper circuit 3 and the converter 4 are anode-gate-type GTOs made of SiC (hereafter each referred to as a SiC-GTO), and their rated voltage and current are 8 kV, 800 A and 8 kV, 400 A, respectively. The power capacity of this apparatus is about 450 kW in consideration of power losses occurring in the chopper circuit 3, the converter 4 and the transformer 5. In the case when the power consumption of the important loads 104 and 105 increases and transiently exceeds the power capacity of the substation 130, the voltage detector 10 and the current detector 11 detect the state, and active power corresponding to the excess amount of power, up to about 450 kW, can be supplied from the secondary battery 2 to the system bus line 102. The secondary battery 2 is charged by the power supplied from the system bus line 102 in "stationary time" (the supply and demand state of the power is balanced between the substation 130 and the loads, such as the important loads 104 and 105 and the general load 110).

Although the DC output voltage of the secondary battery 2 such as a redox flow battery is 800 V for example, at the beginning of the period of use, it tends to lower from 800 V as the period of use becomes longer. Hence, during the peak cut time, the output voltage of the secondary battery 2 is raised by the chopper circuit 3 of a constant-voltage-output-maintaining type, and the voltage is made constant at all times and is supplied to the converter 4. The converter 4 for converting DC power into AC power uses a SiC-GTO as a switching device. The converter 4 is not shown because it has a general and known circuit configuration. Because of limitations due to defects inside the crystals of SiC, it is difficult to increase the rated current of the SiC-GTO. Therefore, it is desirable to obtain a desired power rate at a low current rate and at a raised voltage rate. In this embodiment, the output voltage of 800 V of the redox flow battery serving as the secondary battery 2 is raised to 1600 V by the chopper circuit 3. For example, the DC power of about 1600 V, 300 A is supplied to the converter 4. The converter 4 converts this DC power to an AC power of 736 V at 354 A and applies it to the transformer 5. The transformer 5 raises the voltage of 736 V to 6.6 kV, outputs the voltage to the system bus line 102 via the switch 6, and supplies to the loads 104, 105 and 110.

During the peak cut time, while the stable power supply apparatus 1 supplies the power of 450 kW in peak cut time, if a lightning accident occurs in the power system 100 and if an instantaneous voltage drop (hereafter referred to as an instantaneous drop) occurs in the voltage of the system bus line 102 owing to the influence of the accident, serious trouble, such as operation stop, may be caused in the important loads 104 and 105. To prevent this, the switch 109 is opened immediately to disconnect the general load 110. At the same time, in the stable power supply apparatus 1, the control circuit 9 controls the converter 4 so that a DC power of 2.5 MW at the voltage of 800 V, for example, corresponding to the instantaneous large-current supplying capability is supplied from the secondary battery 2. The chopper circuit 3 raises the DC voltage of 800 V to 3.2 kV and supplies the voltage to the converter 4. The PWM pulse width for driving the converter 4 is made larger than that in rated operation time, and the converter 4 outputs an active power of 450 kW at 1.47 kV and a reactive power of 2.78 MVAR (the unit of reactive power) at about 1.47 kV. The voltage of the active power and the reactive power is raised to 6.6 kV by the transformer 5 and supplied to the system bus line 102, whereby voltage drop is prevented. It is very rare that the voltage drop at the system bus line 102 continues for 0.5 seconds or more owing to the influence of lightning. The converter 4 of the stable power supply apparatus 1 in accordance with this embodiment is designed so as to be able to supply an active power of 450 kW and a reactive power of up to 2.78 MVAR for about six seconds, therefore this is sufficient for a countermeasure for an instantaneous drop owing to lightning. In the above-mentioned example, the converter 4 can convert an instantaneous large power about six times the rating for four seconds.

Figure 8:
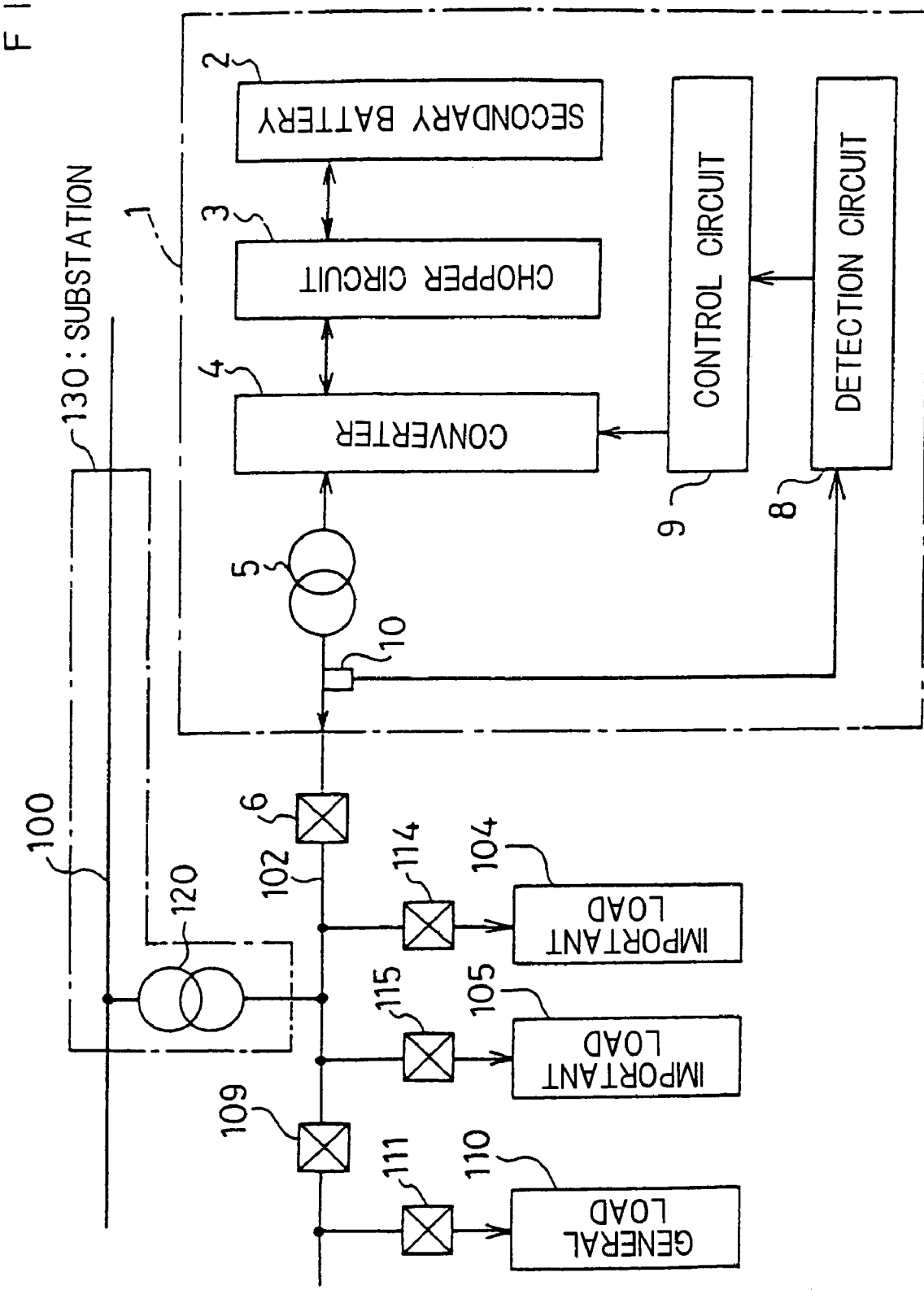
FIG. 8 is a block diagram of the stable power supply apparatus in accordance with the first embodiment of the present invention in the case of dealing with an instantaneous drop.

In the case that the stable power supply apparatus in accordance with this embodiment is used to deal with only instantaneous drops, only the voltage detector 10 for voltage detection should be provided as shown in FIG. 8; even if the current detector 11 shown in FIG. 1 is not provided, it can be dealt with by using the voltage data of the substation.

In the stable power supply apparatus 1 in accordance with this embodiment, the converter 4 can be operated at power far exceeding the rating because a SiC-GTO is used as a switching device.

Figure 2:
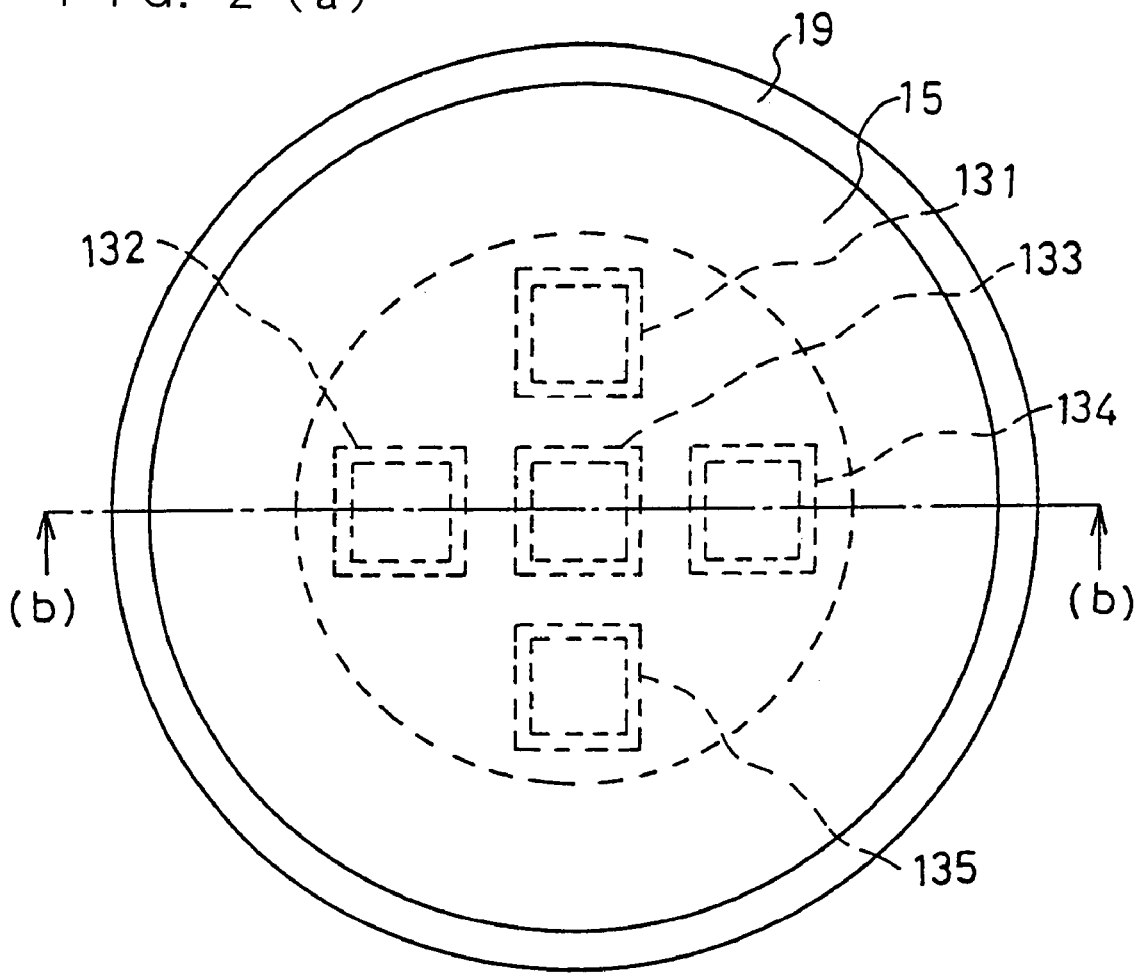
FIG. 2 (a) is a top view of the module configuration of a SiC-GTO device for a converter in accordance with the first embodiment.
Figure 2:
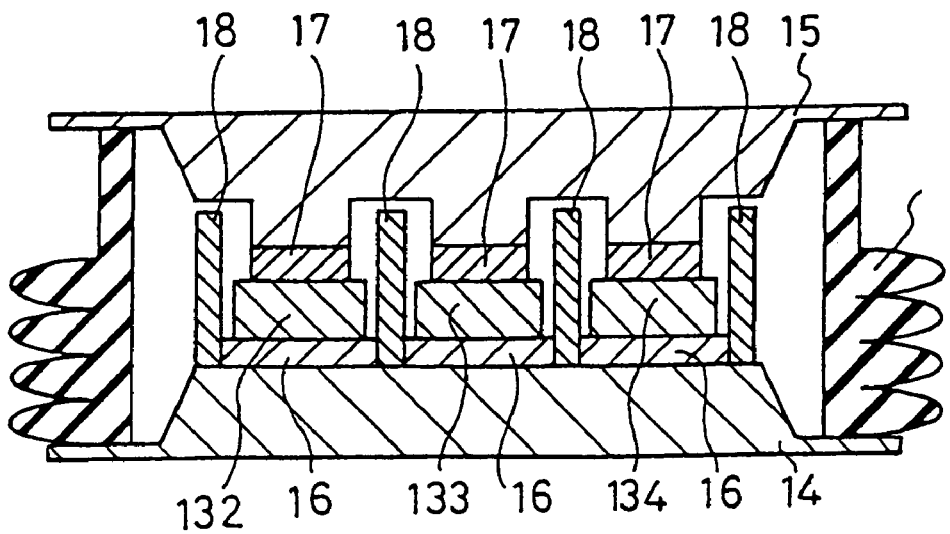
Figure 3:
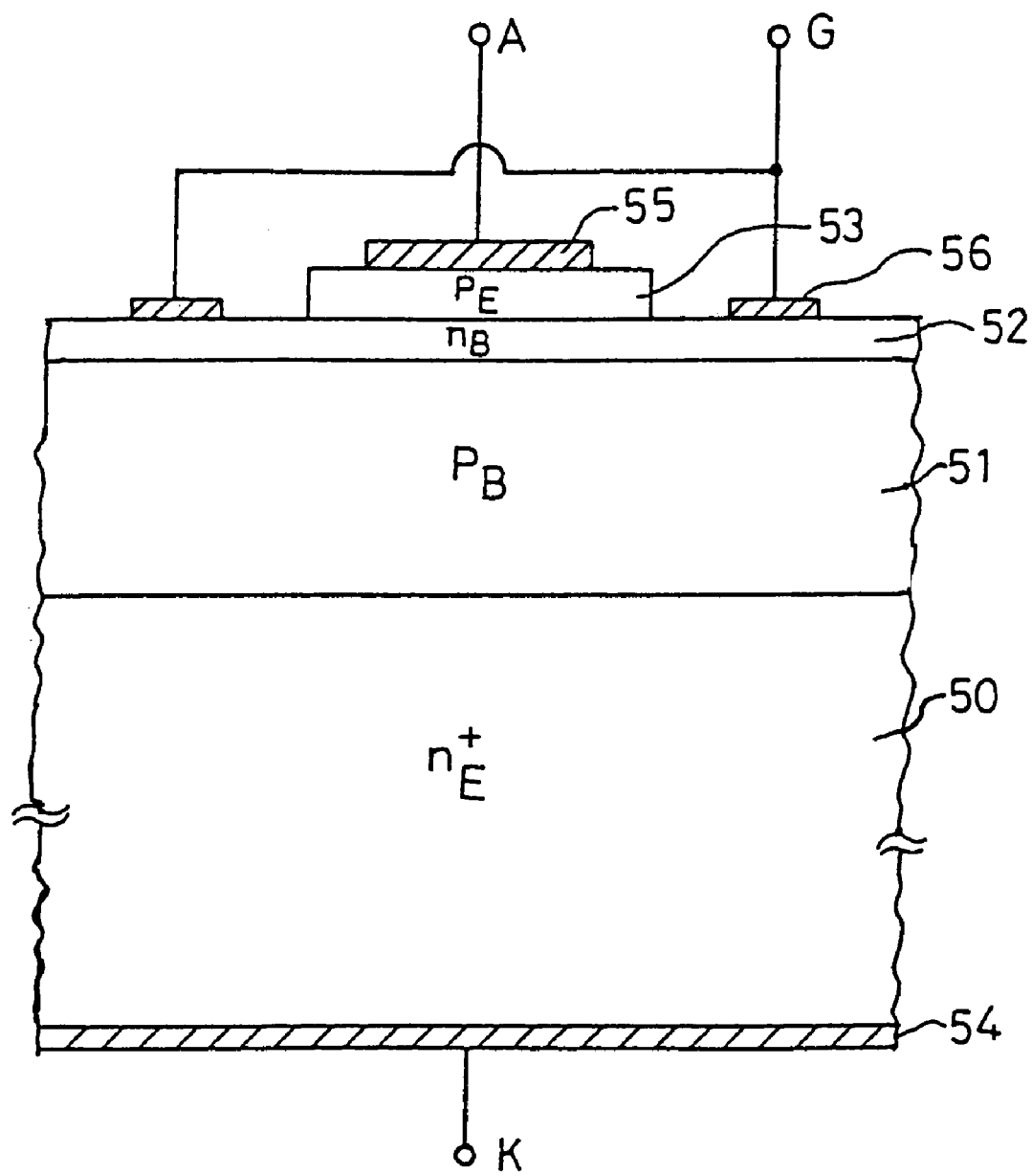
FIG. 3 is a cross-sectional view of a SiC-GTO chip.

FIG. 2 (a) is a top view of an anode-gate-type SiC-GTO device having a rated voltage of 8 kV and a rated current of 400 A, which is used in this embodiment, and FIG. 2 (b) of is a sectional view taken along the line b-b. This SiC-GTO device is obtained by connecting in parallel five anode-gate-type SiC-GTO chips 131 to 135 having a rated current of 80 A so as to form a module. FIG. 2 (b), the five GTO chips 131, 132, 133, 134 and 135 having a nearly square shape of 7 mm on one side, are held between an intermediate lower electrode 16 provided on a cathode electrode 14 and an intermediate upper electrode 17 provided on an anode electrode 15 and electrically connected in parallel. Spacers 18 are used to determine the positions of the respective GTO chips 131 to 135 on the cathode electrode 14. A ceramic package 19 is used to keep a constant distance between the cathode electrode 14 and the anode electrode 15 and to keep electrical insulation therebetween; its diameter is about 10 cm. FIG. 3 shows a cross-section of the anode-gate-type SiC-GTO chip 131. In this GTO chip 131, a p-type base layer 51, an n-type base layer 52 and a p-type emitter layer 53 are laminated in this order on the upper face of a substrate 50 of n-type SiC functions as an emitter. A cathode electrode 54 is provided on the lower face of the substrate 50, and an anode electrode 55 is provided on the p-type emitter layer 53. An anode-gate electrode 56 is provided on the n-type base layer 52.

The GTO chip 131 turns on when a drive current is passed from the anode A to the anode-gate G. After turned on, the GTO chip 131 turns off when the current flowing between the cathode K and the anode A is diverted around between the cathode K and anode-gate G. The thicknesses of the respective layers constituting the GTO chip 131 are as follows; the substrate 50 is about 400 im, the p-type base layer 51 is about 80 im, the n-type base layer 52 is about 3 μm, and the p-type emitter layer 53 is about 5 im, for example. In the currently available SiC, the minimum resistivity of the p-type SiC is larger by an order or more of magnitude than that of the n-type SiC. Hence, in the case that the substrate 50 which is the thickest layer is formed by n-type SiC, the resistance can be made lower than that in the case that the substrate is formed by p-type SiC. This is advantageous in that power loss during the on-state can be decreased significantly. In this case, the gate turning-on current and the gate turning-off current of a GTO thyristor can be made smaller significantly by providing the anode-gate electrode 56 on the n-type base layer 52 as shown in FIG. 3 and by performing anode-gate driving than by providing the anode-gate electrode 56 on the p-type base layer 51 and by performing cathode-gate driving. Hence, the output of a drive circuit, not shown, requires only small power; therefore, significant size and weight reduction is made possible, and loss reduction can be made, whereby the object of the present invention can be attained more effectively.

As mentioned above, since the bipolar operation of the Si-GTO device has a negative temperature dependency; if a large current flows and the internal temperature of the device rises, the current increases further and the temperature rises more and more, and thermal runaway eventually occurs, resulting in the breakage of the device. In the case that a plurality of Si-GTO chips are connected in parallel, if current concentration occurs once in an Si-GTO chip, the currents of the other Si-GTO chips concentrate in the chip, and this may result in thermal runaway in some cases. Hence, it is difficult to connect numerous Si-GTO chips in parallel. On the other hand, as mentioned above, the SiC-GTO chips can be connected in parallel in the case that the time during which a large current flows is a short time of 10 seconds or less. The time duration in which the large current can flow is the time duration elapsed in which the internal temperature of the device rising owing to the difference between the amount of heat generated inside the device and the amount of heat dissipated outside reaches the limit temperature wherein the property of the device as a semiconductor device can be maintained. This time duration is determined depending on the structure of the device, the density of the flowing current, the structure of the module; in the case of the configuration shown in FIG. 2, it was confirmed by experiment that no problem occurred for about eight seconds. A test was carried out by generating an instantaneous drop of eight seconds while a peak cut operation test was conducted for about 45 minutes for example, and peak cut power was able to be supplied without affecting the important loads 104 and 105.

In this embodiment, by utilizing the instantaneous large-power operation capability of the SiC-GTO, the converter using this SiC-GTO operates as a converter that converts power six times the rating for 4.5 seconds to prevent the influence of an instantaneous drop. Hence, unlike the case of the conventional design, the capacity of the converter is not required to be the large power required in consideration of an instantaneous drop, it is sufficient to have a capability for supplying power required in peak cut time, amounting to a fraction of power required at the instantaneous drop. Therefore, the stable power supply apparatus for peak cut can be made significantly compact in size, light in weight, low in loss and low in cost.

SECOND EMBODIMENT

Figure 4:
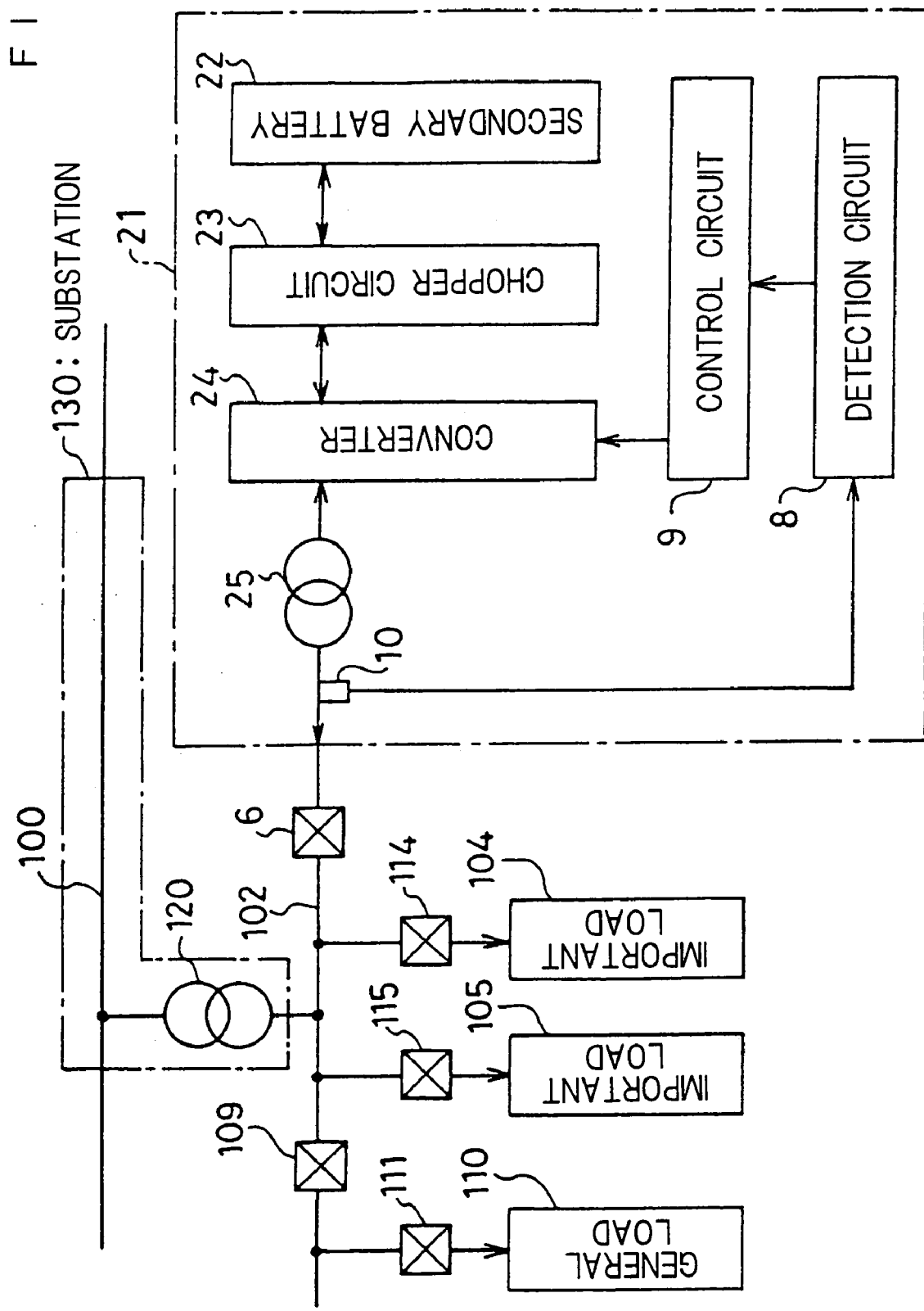
FIG. 4 is a block diagram of a stable power supply apparatus for load leveling in accordance with a second embodiment and a sixth embodiment of the present invention.

FIG. 4 is a block diagram of a stable power supply apparatus 21 for load leveling in accordance with a second embodiment of the present invention. The stable power supply apparatus 21 has a secondary battery 22 formed of a sodium sulfur battery having a rated voltage of 1.5 kV and a rated power of 1.5 MW, a bidirectional chopper circuit 23, a converter 24 and a transformer 25, and is connected to a system bus line 102 of a voltage of 6.6 kV via a switch 6, like the stable power supply apparatus 1 shown in the above-mentioned FIG. 1. The other configurations are the same as those of the stable power supply apparatus 1.

"Load leveling" designates that power is stored during a low power demand time zone and the power is discharged during a high power demand time zone to deal with a phenomenon wherein power demand becomes significantly different depending on the time zone of the day. The switching device of the chopper circuit 23 is an anode-gate-type SiC-GTO having a voltage of 10 kV and a current of 1400 A, and the switching device of the converter 24 is an anode-gate-type SiC-GTO having a voltage of 10 kV and a current of 600 A. The secondary battery 22 is charged with constant power at night during which power demand is small, for eight hours from 22 o'clock to 6 o'clock, for example. A power of about 1.35 MW is supplied from the secondary battery 22 in the daytime during which power demand is particularly large, for eight hours from 9 o'clock to 17 o'clock, for example. The SiC-GTO device for the converter 22 in accordance with this embodiment is formed of six GTO chips, having a rated current of 100 A, which are provided inside a package similar to that shown in FIG. 2 and connected in parallel so as to form a module.

By using a SiC-GTO having a relatively small rated current, in order to increase the rated power by raising its voltage, the DC output voltage of 1.5 kV of the secondary battery 22 (Sic) is raised to 3 kV by the chopper circuit 23 while a power of 1.35 MW is supplied in the daytime. As a result, a DC power of about 3 kV at 480 A is supplied to the converter 24 (Sic). The converter 24 converts this DC power to an AC power of about 1.38 kV at 566 A and supplies the power to the transformer 25. The transformer 25 raises the voltage to 6.6 kV and supplies the voltage to the system bus line 102 via the switch 6.

While the power of 1.35 MW is supplied, if an instantaneous drop owing to a lightning accident occurs in the power system 100 (FIG. 1) and if the voltage of the system bus line 102 lowers significantly owing to the influence thereof, the important loads 104 and 105 are liable to stop operation. To prevent this, the output voltage of the secondary battery 22 is raised to 4.5 kV by the chopper circuit 23 and supplied to the converter 24. In addition, the PWM pulse width in switching control of the converter 24 is expanded. Consequently, an active power of about 1.35 MW of the rated value, and a reactive power of about 6.44 MVAR at a voltage of about 2.07 kV are output from the converter 24. The output of the converter 24 is raised by the transformer 25 and supplied to the system bus line 102, thereby preventing the voltage of the system bus line 102 from lowering.

In this embodiment, by utilizing the instantaneous large-power operation capability of the SiC-GTO, the converter having a rated power of 1.5 MW operates as a converter having a rated power about 4.7 times 1.5 MW for a predetermined time period during which the influence of an instantaneous drop is prevented. Therefore, the stable power supply apparatus for use in the load leveling can be made significantly compact in size, light in weight, low in loss and low in cost.

THIRD EMBODIMENT

Figure 5:
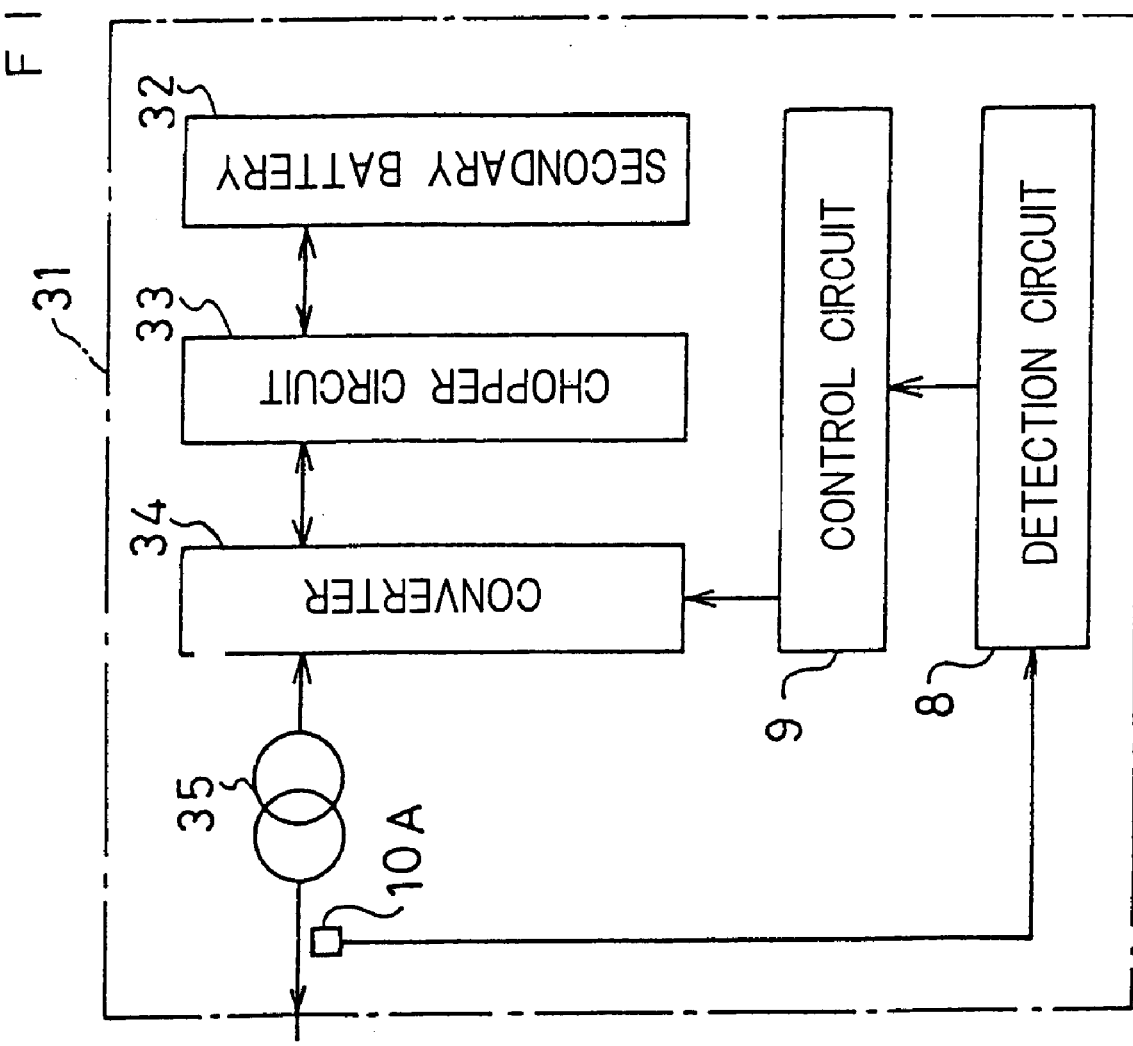
FIG. 5 is a block diagram of a stable power supply apparatus for frequency fluctuation prevention in accordance with a third embodiment of the present invention.

FIG. 5 is a block diagram of a stable power supply apparatus 31 for use in frequency fluctuation suppression in accordance with a third embodiment of the present invention. The stable power supply apparatus 31 has a secondary battery 32 using a redox flow battery having a voltage of 800 V and a rated power of 700 kW, a bidirectional chopper circuit 33, a converter 34 having a rated power of 600 kW and a transformer 35, and is connected to the system bus line 102 of a voltage of 6.6 kV via the switch 6 shown in FIG. 1. The other configurations are the same as those shown in FIG. 1.

"Frequency fluctuation suppression" designates to maintain the frequency at a rated value by adjusting the power supply using another power supply to prevent the frequency of AC of the power system 100 from being deviated from the rated value (50 Hz or 60 Hz) due to abrupt change in power demand. The switching devices of the chopper circuit 33 and the converter 34 are anode-gate-type SiC-GTOs having a rated voltage of 8 kV and a rated current of 1000 A and having a rated voltage of 8 kV and a rated current of 500 A, respectively. For example, when the supply and demand state of an active power becomes unbalanced abruptly owing to load fluctuations or a short circuit accident, etc., the frequency of the power system 100 fluctuates and becomes unstable. A detector 10A measures the frequency of the system bus line 102, and the measured output is input to the detection circuit 8. The detected output of the detection circuit 8 is applied to the control circuit 9. The control circuit 9 controls the converter 34 on the basis of the detected output; when the frequency lowers, active power is additionally supplied from the secondary battery 32 to the system bus line 102, and conversely, when the frequency rises, active power is absorbed from the system bus line 102 to the secondary battery 32, whereby the fluctuations of the frequency are suppressed. The rated power of the stable power supply apparatus 31 in accordance with this embodiment is 540 kW, for example, and can supply active power, up to the maximum output of about 540 kW, from the secondary battery 32 of the redox flow battery depending on the fluctuations of the frequency.

Also in this embodiment, in order to deal with a voltage drop owing to the deterioration of the redox flow battery of the secondary battery 32 with the passage of time, the output voltage of 800 V of the secondary battery 32 is raised to 1600 V by the chopper circuit 33 when a power of 540 kW is supplied from the secondary battery 32. When the frequency lowers, a DC power of 160 V at 360 A is supplied from the secondary battery 32 to the converter 34. The converter 34 converts this DC power into an AC power of about 736 V at 425 A and applies the power to the transformer 35. The transformer 35 raises the voltage of 736 V to 6.6 kV, and supplies an AC power of about 6.6 kV at 47.4 A to the system bus line 102 via the switch 6, thereby suppressing the frequency from lowering.

When the stable power supply apparatus in accordance with the present embodiment is in operation of the frequency fluctuation suppression by supplying a power of 540 kW to the system bus line 102, in the case that a lightning accident occurs in the power system 100 and an instantaneous drop occurs in the voltage of the system bus line 102 owing to the influence thereof, the important loads 104 and 105 are liable to stop operation. To prevent this, a DC power of 3 MW corresponding to the instantaneous large-current supplying capability is output immediately from the secondary battery 32, and the voltage is raised to 3.2 kV by the chopper circuit 33 and supplied to the converter 34. At the converter 34, by the control of the control circuit 9, the PWM pulse width of the switching operation is made larger than that during the rated operation, and a reactive power of 3.72 MVAR having a voltage of about 1.47 kV is output together with an active power of 540 kW from the converter 34. The voltage of the converter 34 is raised by the transformer 35 and supplied to the system bus line 102 via the switch 6, thereby preventing the voltage of the system bus line 102 from lowering.

A voltage drop at the system bus line 102 owing to the influence of lightning usually lasts 0.5 seconds or less, and a voltage drop lasting longer than that is very rare. The stable power supply apparatus 31 in accordance with the present embodiment can supply a reactive power of up to 3.46 MVAR together with an active power of 540 kW for 3.5 seconds. Therefore, this apparatus can sufficiently deal with an ordinary instantaneous drop caused by lightning. In this case, the converter 34 is operated at instantaneous large power about 5.7 times the rated power for 3.5 seconds.

The SiC-GTO device which is used for the converter 34 in accordance with this embodiment is formed of six SiC-GTO chips having a rated current of 100 A, which are provided inside a package similar to that shown in FIG. 2 and connected in parallel so as to form a module. Even in the case when the control current of the converter 34 significantly exceeds the rated current of the SiC-GTO device, since the resistance of the low-concentration base region serving as the electric field relaxation region (not shown) of the SiC-GTO device has a positive temperature dependency, when the time during which the large current flows is short; therefore, in a temperature range of several hundred degrees centigrade or more, this positive temperature dependency is canceled with the negative temperature dependency of the bipolar operation, whereby thermal runaway owing to current concentration can be prevented.

In the present embodiment, by utilizing the instantaneous large-power operation capability of the SiC-GTO, the converter 34 having a rated power of 700 kW can be operated as a converter having rated power about 5.7 times the rated power for a short time during which the influence of an instantaneous drop is prevented. Therefore, the stable power supply apparatus for frequency fluctuation suppression can be made significantly compact in size, light in weight, low in loss and low in cost.

FOURTH EMBODIMENT

Figure 6:
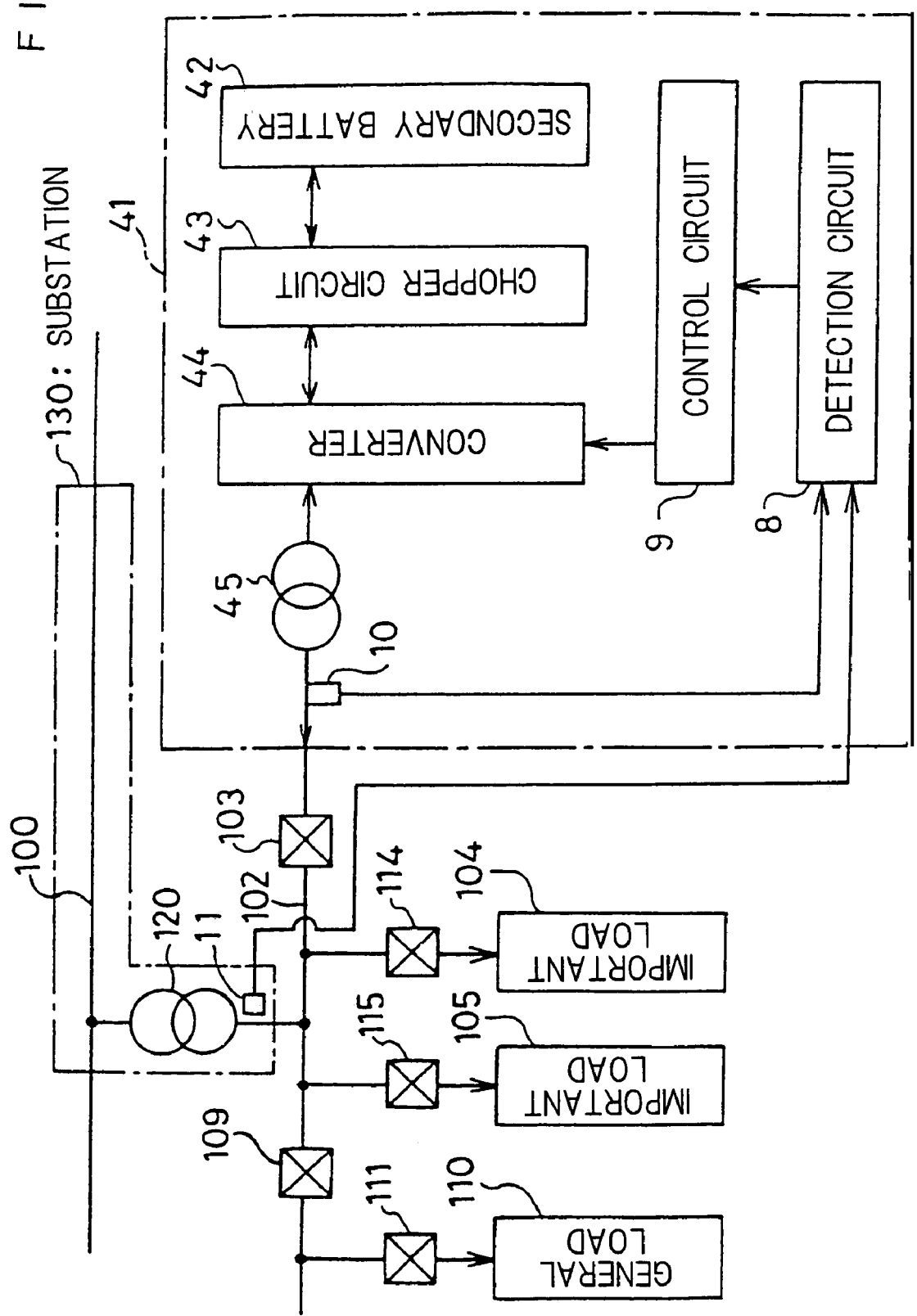
FIG. 6 is a block diagram of a stable power supply apparatus for peak cut in accordance with a fourth embodiment of the present invention.

FIG. 6 is a block diagram of another example of a stable power supply apparatus 41 for use of peak cut in accordance with a fourth embodiment of the present invention. In this embodiment, a sodium sulfur battery having a rated output of 500 kW at a voltage of 800 V is used as a secondary battery 42. The switching device of a converter 44 is a p-type gate-type SiC-IGBT having a rated voltage of 7 kV and a rated current of 400 A. The other configurations, operations, functions, etc. are substantially similar to those of the first embodiment. While the stable power supply apparatus 41 supplies a peak cut power of 450 kW for example, when a lightning accident occurs in the power system 100 and the voltage of the system bus line 102 lowers owing to the influence thereof, a reactive power of 2.78 MVAR at a voltage of about 1.47 kV is output together with an active power of 460 kW from the converter 44 to prevent the operation of the important loads 104 and 105 from stopping. The output of the converter 44 is raised by the transformer 45 and supplied to the system bus line 102, thereby preventing the voltage the system bus line 102 from lowering. In this case, instantaneous large power about six times the rated power is supplied from the converter 44 for about three seconds.

The SiC-IGBT device in accordance with this embodiment is obtained by connecting in parallel eight chips having a rated current of 50 A so as to form a module. The operation of the apparatus at a current significantly exceeding the rated current in the present invention is made possible by the temperature dependency that is unique to the SiC-IGBT. As described above before, in the case of the SiC-IGBT, unlike the case of a Si-IGBT, the positive temperature dependency of the resistance in the low-concentration drift region serving as the electric field relaxation region gives a significant effect. The SiC-IGBT exhibits a positive (Sic) temperature dependency at several hundred degrees centigrade or more.

Even in the case of the Si-IGBT, the negative temperature dependency of the bipolar operation is cancelled by the positive temperature dependency of the unipolar operation, and thermal runaway can be prevented even if large current flows. However, this is a case wherein the temperature of Si is lower than the limit temperature at which the property of the semiconductor can be maintained. At 200° C. or more close to the limit temperature, the bipolar operation becomes predominant abruptly; hence, even the positive temperature dependency of the low-concentration drift region cannot cancel the negative temperature dependency, and thermal runaway occurs.

In the case of the SiC-IGBT, at several hundred degrees centigrade or more, the positive temperature dependency of the low-concentration drift region cancels the negative temperature dependency of the bipolar operation, and conversely the positive temperature dependency becomes predominant, consequently the SiC-IGBT has positive temperature dependency. Hence, by connecting a plurality of SiC-IGBTs in parallel, a current far larger than that of the Si-IGBT can be passed for a short time. As mentioned above, in the SiC-IGBT, in order to attain a large rated current capacity, a plurality of chips can easily be connected in parallel so as to form a module, and the reliability of the module is high.

Unlike a thyristor device such as a GTO, an IGBT has a function of controlling the current passing therethrough by applying a control voltage to the gate. Hence, thermal runaway can be prevented by detecting the current passing through a SiC-IGBT device at high speed and by limiting the PWM pulse width of a control signal so that a current larger than a predetermined current does not flow; in this aspect, numerous IGBT chips can also be used easily in parallel connection. If numerous chips having low switching speed are connected in parallel, current concentrates in a chip having low breaking speed in turn off time, and the chip is apt to be broken. However, since the switching speed of the SiC-IGBT is higher than that of the SiC-GTO by one digit or more, this current concentration is avoided; in this respect, parallel connection is made possible.

In the case that the stable power supply apparatus in accordance with this embodiment is used to deal with only instantaneous drops, only the voltage detector 10 for voltage detection should be provided as shown in FIG. 9; even if the current detector 11 shown in FIG. 6 is not provided, instantaneous drops can be dealt with by using the voltage data of the substation.

In this embodiment, by utilizing the instantaneous large-power operation capability of the SiC-IGBT, the converter 44 having a rated power of 500 kW can be operated as a converter having a rated power about six times the rated power for a short time during which the influence of an instantaneous drop is prevented. Therefore, the stable power supply apparatus 41 for peak cut can be made significantly compact in size, light in weight, low in loss and low in cost.

FIFTH EMBODIMENT

Figure 7:
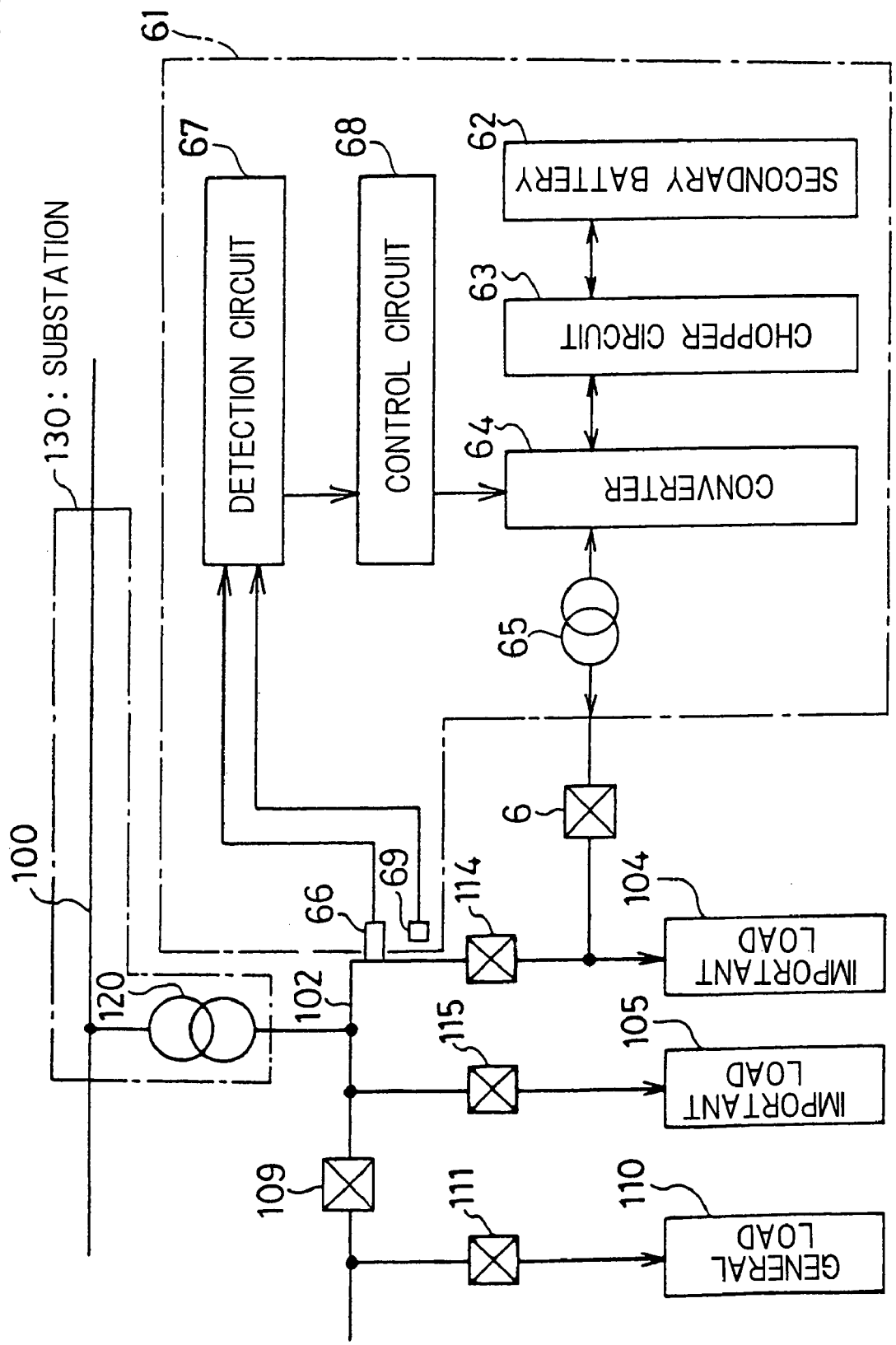
FIG. 7 is a block diagram of a stable power supply apparatus in accordance with a fifth embodiment of the present invention.

FIG. 7 is a block diagram of a stable power supply apparatus 61 for peak cut in accordance with a fifth embodiment of the present invention. The stable power supply apparatus for peak cut in accordance with this embodiment is an apparatus that carries out peak cut for only the important load 104 that is particularly important. The peak cut apparatus 61 comprises a redox flow battery 62 having a rated power of 350 kW, a bidirectional chopper circuit 63, a converter 64 having a rated power of 350 kW, a transformer 65 also serving as an interconnecting reactor, a voltage detector 66, a current detector 69, a detection circuit 67 and a control circuit 68. This apparatus is connected to the connection point of the important load 104 and the switch 114 via the switch 6, and further connected to the system bus line 102 of 6.6 kV via the switch 114. The redox flow battery 62 can supply power at a DC voltage of about 800 V for about 1.5 hours. The chopper circuit 63 and the converter 64 are formed of anode-gate-type SiC-GTOs rated at 8 kV, 1000 A and rated at 8 kV, 300 A, respectively. The power capacity of this apparatus is about 317 kW because power losses occur in the chopper circuit 63, the converter 64 and the transformer 65; however, in the case when fluctuations occur in the important load 104 and when the power capacity transiently exceeds the predetermined power capacity of the substation, an active power of up to about 317 kW can be supplied from the redox flow battery 62 depending on the load. The redox flow battery 62 has been charged via the system bus line 102 during the time other than the peak cut time.

When a lightning accident occurs in an upstream system and when the voltage of the system bus line lowers owing to the influence thereof while a peak cut power of 317 kW is supplied, the switch 114 is turned off instantaneously to prevent the operation of the important load 104 from stopping. An active power of 3 MW is supplied from the converter 64 to the important load 104 via the transformer 65 (Sic), whereby the influence of the instantaneous drop can be prevented. In this case, the converter 64 can be operated at an instantaneous large power about 9.5 times the rating within two seconds or less. When the voltage of the system bus line 102 returns within this period to the state before the instantaneous drop, the switch 114 is turned on and the predetermined power is supplied from the system bus line to the important load. This instantaneous large power changes depending on operation time, and operation is possible at an active power that is 2 to 12 times the rated power. In practical design, it is desirable that the active power should be 3 to 10 times the rated power. The above-mentioned operation of the converter 64 at the active power far exceeding the rating is made possible by using SiC-GTOs, just as in the cases of the embodiments 1 and 2. The SiC-GTO device in accordance with this embodiment is obtained by connecting in parallel, for example six chips having a rated current of 50 A so as to form a module.

In the case that the stable power supply apparatus in accordance with this embodiment is used to deal with only instantaneous drops, only the voltage detector 66 for voltage detection should be provided as shown in FIG. 10; even if the current detector 69 shown in FIG. 7 is not provided, instantaneous drops can be dealt with by using the voltage data of the substation.

In this embodiment, by utilizing the instantaneous large-power operation capability of the SiC-GTO, the converter having a rated power of 350 kW can be operated as a converter having a rated power about 9.5 times the rated power for two seconds or less during which the influence of an instantaneous drop is prevented; therefore, the stable power supply apparatus for peak cut can be made significantly compact in size, light in weight, low in loss and low in cost.

SIXTH EMBODIMENT

A sixth embodiment of the present invention is a stable power supply apparatus for load leveling, and this embodiment has a configuration similar to that of the above-mentioned second embodiment shown in FIG. 4. It will thus be described referring to FIG. 4. Although the stable power supply apparatus 21 in accordance with the above-mentioned second embodiment supplies active power having the rated value in the stable power supply apparatus 21 in accordance with the present embodiment, the control circuit 9 controls the converter 24 so as to supply an active power that is 2 to 12 times the rated value. For this purpose, the control circuit 9 carries out control so as to advance the phase of the output voltage of the converter 24 with respect to the phase of the voltage of the system bus line 102. The stable power supply apparatus 21 in accordance with the present embodiment has a secondary battery 22 formed of a sodium sulfur battery having a rated power of 1.0 MW, a chopper circuit 23, a bidirectional converter 24 having a rated power of 1.0 MW and a transformer 25, and is connected to the system bus line 102 of 6.6 kV via the switch 6. The switching devices of the chopper circuit 23 and the converter 24 are formed of an anode-gate-type SiC-GTO having 8 kV at 800 A. In the stable power supply apparatus 21 in accordance with this embodiment, the secondary battery 22 is charged with constant power for eight hours at night during which power demand is small, and a power of 0.9 MW for example, is supplied from the secondary battery 22 for eight hours in the daytime during which power demand is large. The SiC-GTO device for the converter 24 in accordance with this embodiment is obtained by connecting eight chips having a rated current of 100 A in parallel so as to be formed into a module.

Also in the present embodiment, like the above-mentioned first embodiment, to deal with the relatively small rated current of the SiC-GTO, the output DC voltage of the secondary battery 22 is raised to 3 kV by the chopper circuit 23 when a power of 0.9 MW is supplied in the daytime. As a result, a DC current of about 320 A flows in the converter 24 (Sic). The converter 24 converts a DC voltage of 3 kV to an AC voltage of about 1.2 kV and applies the voltage to the transformer 25. The AC voltage is raised to 6.6 kV by the transformer 25 and output to the system bus line 102 via the switch 6 (Sic) and then supplied to the respective loads.

In the state that the power of 0.9 kW is supplied, when a lightning accident occurs and the voltage of the system bus line 102 lowers owing to the influence thereof, a DC power of 4.8 MW is supplied from the secondary battery 22 to the converter 24 via the chopper circuit 23 in order to prevent the operation stop of the important loads 104 and 105 owing to the voltage drop. From the converter 24, an active power of about 4.5 MW and a reactive power of about 3.38 MVAR at an output voltage of about 1.38 kV are output. Active power that is up to 12 times the rating, about 12 MW, can be output for a very short time. The output voltage is raised to 6.6 kV by the transformer 25 and supplied to the system bus line 102. Hence, the voltage of the system bus line 102 is prevented from lowering, and a part of the active power is supplied to the important loads 104 and 105, whereby operation stop owing to the instantaneous drop is prevented.

As described above, in the present embodiment, by utilizing the instantaneous large-power operation capability of the SiC-GTO, a DC power of about 5 MW that is about five times the rating is output from the secondary battery 22 having a rated power of 1 MW for a short time during which the influence of an instantaneous drop is prevented, whereby the converter 24 having a rated power of 1 MW is operated at a power of about 6 MW that is about six times the rating. In other words, by using the secondary battery 22 that can discharge power two to several times the rating and the converter 24 that can operate at power two to several times the rating during the instantaneous drop, the stable power supply apparatus for load leveling can be made significantly compact in size, light in weight, low in loss and low in cost.

Although the present invention has been described in accordance with the first to sixth embodiments, the present invention is not limited to these embodiments, but is susceptible of various modifications and applications.

For example, the switching devices of the converters 4, 24, 34 and 44 are not limited to GTOs or IGBTS; various wide-gap bipolar semiconductor devices, such as electrostatic induction thyristors, bipolar transistors, emitter switched thyristors (EST), IEGT, SIAFET and SIJFET, can be used as the switching device. In addition, the above-mentioned semiconductor devices using wide-gap semiconductor materials other than SiC, that is, gallium nitride, diamond, etc., can also be used similarly for the above-mentioned respective converters.

Other than the redox flow battery and the sodium sulfur battery, a lead-acid battery, a zinc chlorine battery, a zinc bromine battery, a lithium ion battery, etc. may also be used as the secondary batteries 2, 22, 32 and 42.

In the case of a stable power supply apparatus having a small power capacity of 200 kW or less, its current capacity is also small; hence, a wide-gap bipolar semiconductor device having a small chip area is sufficiently adaptable. In this case, the chopper circuit for raising voltage to obtain a predetermined power at a small current is not necessarily required. In this case, the voltage of the battery may be directly applied to the converter.

Wide-gap bipolar semiconductor devices can easily be made resistant against high voltage. By making the device resistant against 20 kV or more for example, it can be connected directly to the system bus line 102 of 6.6 kV; hence, only an interconnecting reactor can be used without using the transformers 5, 25, 35 and 45.

In the above-mentioned respective embodiments, description is made as to the power distribution system bus line of 6.6 kV as an example; however, by making the respective elements constituting the stable power supply apparatus resistant against high voltage and large current, the elements can also be applied to a stable power supply apparatus connected to a power system located further upstream. In addition, the stable power supply apparatus in accordance with the present invention can also be applied to an "instantaneous power failure" lasting a relatively long time exceeding several minutes in the case of a short circuit or a ground fault caused by a small animal, such as a snake or a bird, caught on power transmission lines or by trees which contact with power transmission lines. Furthermore, in the case when one of a plurality of generators of a power transmission power supply breaks down or when a load (plant or the like) of a bulk power customer suddenly stops operation, abrupt power fluctuations may occur, and the supply and demand imbalance of power may continue for five or more minutes. The stable power supply apparatus in accordance with the present invention can also be applied to deal with the fluctuations or the like in the frequency of the system owing to the supply and demand imbalance of power for five minutes to one hour, far longer than the duration (several seconds) of an instantaneous drop owing to lightning, by increasing the capacity of the secondary battery and by taking measures for maintaining the temperatures of the switching devices at a predetermined temperature or less, such as by cooling the switching devices. In the case of this long time, the stable power supply apparatus in accordance with the present invention can also be used as an emergency power supply (Sic) since its power can be adjusted in the range of about 1.5 to 3 times the rated output.

As described in detail in the respective embodiments, according to the present invention, by utilizing the instantaneous large-power operation capability of the wide-gap bipolar semiconductor device, the converter having this wide-gap bipolar semiconductor device is operated at a power several times or more the rated power of the converter, exceeding the instantaneous large-power supplying capability of the secondary battery, for a short time during which the influence of an instantaneous drop is prevented. Hence, an effect wherein the stable power supply apparatus can be made significantly compact in size, light in weight, low in loss and low in cost is obtained.

The invention claimed is:

1. A stable power supply apparatus comprising:
   a secondary battery for charging and discharging DC power;
   a converter connected between said secondary battery and a system bus line of a power transmission power supply or between said secondary battery and a load connected to the system bus line and having a wide-gap bipolar semiconductor device as a switching device, for converting AC inputted from said system bus line into DC and outputting to said secondary battery, and for converting DC output from said secondary battery into AC and outputting to said system bus line;
   a detection apparatus for detecting at least a voltage of said system bus line and for detecting a supply and demand state of the power on the basis of the detected voltage; and
   a control circuit for controlling said converter so that the converter is operated under a rated power of the converter to charge said secondary battery when the supply and demand state is balanced and to discharge said secondary battery for supplying power to said system bus line when the demand becomes larger than the supply on the basis of the detected output of said detection apparatus, and so that the converter is operated under the power that is 3 to 30 times the rated power when an instantaneous voltage drop wherein the voltage of the system bus line lowers significantly is detected on the basis of the detected output of the detection apparatus.

2. A stable power supply apparatus comprising:
   a secondary battery for charging and discharging DC power;
   a converter connected between said secondary battery and a system bus line of a power transmission power supply or between said secondary battery and a load connected to the system bus line and having a wide-gap bipolar semiconductor device as a switching device, for converting AC inputted from said system bus line into DC and outputting to said secondary battery, and for converting DC output from said secondary battery into AC and
   outputting to said system bus line; a detection apparatus for detecting at least a voltage of said system bus line and for detecting a supply and demand state of the power on the basis of the detected voltage; and
   a control circuit for controlling said converter so that the converter is operated under a rated power of the converter to charge said secondary battery when the supply and demand state is balanced and to discharge said secondary battery for supplying power to said system bus line when the demand becomes larger than the supply on the basis of the detected output of said detection apparatus, and so that the converter is operated under the power that is 1.4 to 5 times the rated power when an instantaneous power failure is detected on the basis of the detected output of the detection apparatus.

3. A stable power supply apparatus in accordance with claim 1 or 2, further comprising a bidirectional chopper circuit connected between said secondary battery and said converter, for lowering the charge voltage of said secondary battery and for raising the discharge voltage of said secondary battery.

4. A stable power supply apparatus in accordance with claim 1 or 2 wherein said detection apparatus further detects a current of said system bus line and detects the supply and demand state of the power on the basis of the detected voltage and current.

5. A stable power supply apparatus in accordance with claim 1 or 2 further comprising a transformer provided between said system bus line and said converter and including the function of an interconnecting reactor.

6. A stable power supply apparatus in accordance with claim 1 or 2, wherein said secondary battery is any one of a redox flow battery, sodium sulfur battery, lead-acid battery, and sodium-sulfur battery.

7. A stable power supply apparatus in accordance with claim 1 or 2, wherein said said wide-gap bipolar semiconductor device is a semiconductor device wherein silicon carbide (SiC) is used as a basic material.

8. A stable power supply apparatus in accordance with claim 1 or 2, wherein said wide-gap bipolar semiconductor device is a semiconductor device wherein gallium nitride is used as a basic material.

9. A stable power supply apparatus in accordance with claim 1 or 2, wherein said wide-gap bipolar semiconductor device is formed of at least one SiC-OTO chip.

10. A stable power supply apparatus in accordance with claim 1 or 2, wherein said wide-gap bipolar semiconductor device is formed of at least one SiC-IGBT chip.

11. A stable power supply apparatus in accordance with claim 1 or 2, said wide-gap bipolar semiconductor device is formed of a plurality of SiC-GTO chips connected in parallel.

12. A stable power supply apparatus in accordance with claim 1 or 2, wherein said wide-gap bipolar semiconductor device is formed of a plurality of SiC-IGBT chips connected in parallel.

13. A stable power supply apparatus comprising:
a secondary battery for charging and discharging DC power;
a converter connected between said secondary battery and a system bus line of a power transmission power supply or between said secondary battery and a load connected to the system bus line and having a wide-gap bipolar semiconductor device as a switching device, for converting AC inputted from said system bus line into DC and outputting to said secondary battery, and for converting DC output from said secondary battery into AC and outputting to said system bus line;
a detection apparatus for detecting a frequency of said system bus line and for detecting a supply and demand state of the power on the basis of the detected frequency; and
a control circuit for controlling said converter so that the converter is operated under a rated power of the converter to charge said secondary battery when the supply and demand state is balanced and to discharge said secondary battery for supplying power to said system bus line when the demand becomes larger than the supply on the basis of the detected output of said detection apparatus, and so that the converter is operated under the power that is 3 to 30 times the rated power when an instantaneous voltage drop wherein the voltage of the system bus line lowers significantly is detected on the basis of the detected output of the detection apparatus.

14. A stable power supply apparatus comprising:
a secondary battery for charging and discharging DC power;
a converter connected between said secondary battery and a system bus line of a power transmission power supply or between said secondary battery and a load connected to the system bus line and having a wide-gap bipolar semiconductor device as a switching device, for converting AC inputted from said system bus line into DC and outputting to said secondary battery, and for converting DC output from said secondary battery into AC and outputting to said system bus line;
a detection apparatus for detecting a frequency of said system bus line and for detecting a supply and demand state of the power on the basis of the detected frequency; and
a control circuit for controlling said converter so that the converter is operated under a rated power of the converter to charge said secondary battery when the supply and demand state is balanced and to discharge said secondary battery for supplying power to said system bus line when the demand becomes larger than the supply on the basis of the detected output of said detection apparatus, and so that the converter is operated under the power that is 1.4 to 5 times the rated power when an instantaneous power failure is detected on the basis of the detected output of the detection apparatus.

* * * * *

UNITED STATES PATENT AND TRADEMARK OFFICE
CERTIFICATE OF CORRECTION

PATENT NO. : 7,554,220 B2 Page 1 of 1
APPLICATION NO. : 10/894328
DATED : June 30, 2009
INVENTOR(S) : Yoshitaka Sugawara It is certified that error appears in the above-identified patent and that said Letters Patent is hereby corrected as shown below:

In Column 23, line 9, please delete "SiC-OTO" and insert therefor --SiC-GTO--.

Signed and Sealed this

Thirteenth Day of October, 2009

David J. Kappos
*Director of the United States Patent and Trademark Office*